3,553,254
TRIS[N,N-BIS(HYDROXYMETHYL)CARBAMIC] ACID ESTERS

Giuliana C. Tesoro, Dobbs Ferry, N.Y., and Donald R. Moore, Rutherford, N.J., assignors to J. P. Stevens & Co., Inc., New York, N.Y., a corporation of Delaware
No Drawing. Filed July 6, 1966, Ser. No. 563,057
Int. Cl. C07c 125/06
U.S. Cl. 260—482                                                2 Claims

ABSTRACT OF THE DISCLOSURE

Tris and higher aliphatic polycarbamates, are prepared by reacting polyaryl carbonate with ammonia or an amine in a basic medium. Polycarbamates may also be prepared by reacting an aliphatic polyol with an isocyanate ester.

---

This invention relates to certain nitrogen-containing derivatives of polyhydric alcohols and to their preparation.

More particularly, this invention relates to aliphatic polycarbamates and their reactive nitrogen-substituted derivatives. These compositions are useful as textile modifying agents as well as intermediates for preparing textile modifying agents. The term "poly" as used herein refers to compositions containing more than 2 carbamate nitrogens per molecule. The favored compositions of this invention are included within the formula:

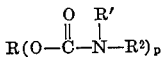

wherein:
R is an unsubstituted or substituted polyvalent aliphatic residue of a polyol, which as described infra can contain one or more heteroatoms,
R' and R², which can be the same or different at any given time, are selected from the group consisting of hydrogen, alkyl, alkoxyalkyl, hydroxyalkyl, with the proviso that at least 3 of the carbamate hydrogens are replaced with a hydroxyalkyl or alkoxyalkyl group at any given time, and
p is an integer greater than 2.

The modification of textile fabrics is well established in the art. Textiles are modified to improve their properties and to make them suitable for new applications. For example, textiles are modified to improve their launderability to make them more resistant to shrinkage and wrinkling, to effect glazing and embossing, impart crease retention and to improve their hand among other reasons.

A facet of textile modification which has been of particular interest recently concerns methods of imparting an essentially permanent configuration to textile materials or to textile substrates containing or derived from cellulose.

Cellulose-containing fabrics have long been known to be useful in the manufacture of clothing, both in their unblended and blended forms. Cellulosics are especially suitable for garment applications because of their low cost and availability, the ease with which they can be dyed, their durability, their compatibility with other fabrics, both natural and synthetic, and their excellent comfort properties.

Within recent years, particularly the last decade, clothing manufactured from synthetic fabrics have made large inroads in the use of cellulosics for garments. In general, synthetics are more resilient and dimensionally stable than the cellulosics and are more resistant to wrinkling and have superior crease recovery.

In order to improve cellulosics and to make them more competitive with the synthetics, various chemical modifications have been explored. These include treatment of the cellulosics with polyfunctional reagents capable of joining cellulosic chains together at the sites of their reactive hydroxyl groups. When reactive polyfunctional reagents having functionality of two or more are reacted with cellulose chains, crosslinked macromolecules are produced. Fabrics made up of fibers in which crosslinked macromolecules are present have greatly improved properties, yet retain the comfort properties of the untreated cellulose fabrics. Particularly important is the finding that fabrics in which the fibers comprise crosslinked cellulose molecules have improved crease recovery in the dry state as well as in the wet state.

Because of the aforementioned improvements obtained in crosslinked cellulosics, many different polyfunctional agents have been employed and some have achieved commercial acceptance. For example, reactive derivatives of simple aliphatic carbamates [ROCONH₂ where R is alkyl] are known to be effective as crosslinking agents for cellulosics. However, it was previously thought that higher functionality could not be expected to result in satisfactory utilization of reactive groups, and that actual damage, such as from excessive retention of chlorine (from bleaching), would be inevitable with high functionality. Quite unexpectedly it has been found that certain tris and higher derivatives of the carbamates, particularly the nitrogen-substituted hydroxymethyl derivatives actually are superior as crosslinking agents for hydroxyl-containing polymers, such as cellulose, when compared with the corresponding mono carbamates and bis carbamates. Durable-press and wash-and-wear characteristics are excellent for fabrics treated with the reactive polycarbamates of this invention. Such characteristics include superior crease recovery, retained even after numerous cycles of laundering, even in the presence of acid sours, and essential freedom from damage by retained chlorine. The latter was particularly unexpected in view of the teaching of the art. Further advantages will be described subsequently.

It is an object of this invention, among many others, to prepare a novel group of compositions, the tris and higher aliphatic polycarbamates in a highly purified state.

It is another object of this invention to prepare certain highly purified N-substituted derivatives of the aliphatic polycarbamates heretofore unavailable.

It is yet another object of this invention to prepare the highly reactive N-(hydroxymethyl) and N,N-bis(hydroxymethyl) derivatives of the tris and higher polycarbamates which are especially valuable as textile modifying agents.

Yet a further object of this invention is to make available new methods for imparting substantially permanent configurations to polymeric materials containing reactive hydroxyl groups, including the cellulosics.

Additional objects to be discussed more fully throughout this application include the development of novel and improved preparative methods, one-step and two-step methods for crosslinking polymeric materials, deferred curing procedures for textile materials and the preparation for certain reagents heretofore unavailable.

Additional objects will suggest themselves to those skilled in the art after a perusal of this application.

The aliphatic tris and higher carbamates of this invention are produced by two favored methods to be described more fully below.

In one process a polyaryl carbonate described and claimed in our copending Ser. No. 563,064 filed of even date, is contacted with ammonia or an amine in the presence of an appropriate solvent. The equation below is believed to indicate the reaction that takes place:

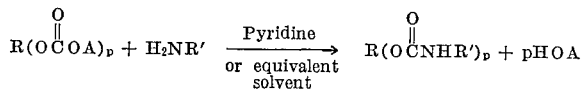

wherein:

R is an unsubstituted or substituted polyvalent aliphatic residue of a polyhydric alcohol;

A is an aryl radical selected from the group consisting of phenyl and substituted phenyl, such as alkylated phenyl;

R' is selected from the group consisting of hydrogen, alkyl, hydroxyethyl or alkoxyalkyl, and p is an integer from at least 3 on up.

In the preferred embodiments of this process, an excess of ammonia or a lower alkylamine over that required by stoichiometry, is contacted with the carbonate reactant in the presence of pyridine or any other suitable solvent until each of the carbonate groups is converted to the desired carbamate. If ammonia is employed or the amine is a gas, it is convenient to pass the gas into the carbonate. However, where the amine reactant is a liquid, then the solution of the carbonate reactant is preferably added portionwise to the amine reactant.

In either event the exothermic reaction is initially carried out between about 10° C. to 50° C. using external cooling when necessary. After the reagents have been brought into contact with each other the temperature is raised to between about 50–120° C. to complete the reaction. The second stage of heating can take from one or more hours to several hours. Longer times are not harmful. After the reaction mixture is cooled the product, which is usually in a crystalline form, is filtered off. Further purification can be accomplished by standard techniques, including recrystallization.

The second method of preparing the polycarbamate intermediates of this invention is by the reaction of an aliphatic polyol with an isocyanate ester type reactant. The reaction is carried out in the presence of a solvent such as pyridine or a similar solvent of comparable basicity. The reaction course is indicated below:

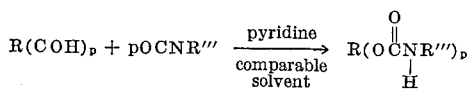

wherein:

R is an unsubstituted or substituted polyvalent aliphatic residue of a polyhydric alcohol;

R''' is an alkyl or alkoxy radical, and p is an integer greater than 2.

The above reaction is ordinarily brought about by adding the isocyanate type reactant to a stirred solution of the polyol in the pyridine or comparable solvent. In the alternative, the order of addition can be reversed. The reaction temperature is not critical and can vary between about 15° to about 45° C. during addition and subsequently, at the reflux temperature of the solvent. After cooling, a nonsolvent for the product is added, i.e., for example, an ether, to precipitate the product and to aid in its crystallization. The product can be further purified by washing or recrystallizing. The reaction time is also flexible in that the addition rate of the reactants can be increased or decreased and reflux time can be extended without risk.

The isocyanate reactant can be an isocyanate ester such as methyl, ethyl, propyl, butyl or pentyl isocyanates, an alkoxyisocyanate such as methoxyethyl or ethoxyethyl isocyanates among others.

The polyols that can be utilized include the unsubstituted and substituted triols, tetrols, pentols, and hexols; butanetriols, pentanetriols, and hexanetriols; butanetetrols, pentanetetrols, hexanetetrols, and heptanetetrols; the alkanepentols and alkanehexols; pentaerythritol, etc. Another useful class of polyols is comprised of polyvinyl alcohol and polysaccharides. The polyols can contain heteroatoms. These include phosphorus, nitrogen, sulfur, and oxygen among others. A useful group of oxygen-containing polyols include alkoxylated polyols, alkoxylated to various degrees. Particularly useful starting materials are those formed by condensing ethylene oxide and (or) propylene oxide with the polyol. A more complete listing of suitable polyols appears in the aforementioned copending ser. No. 563,064.

In both processes described above, the solvent preferentially employed is pyridine. However, other solvents can also be employed if desired. Satisfactory solvents which can be used include the following: quinoline, picolines, and the like.

As indicated earlier, a second aspect of this invention is the preparation of certain N-monosubstituted and N,N-disubstituted derivatives of the aliphatic polycarbamates of this invention. These compositions are prepared from the aliphatic polycarbamate products described supra.

One favored group of embodiments is the oxyalkylene derivatives of the carbamates of this invention wherein at least one (1) carbamate hydrogen is replaced with an oxyalkyl group of the formula:

$$-(CH_2)_nOR$$

wherein:

R is hydrogen or lower alkyl;

n is an integer, preferably one for crosslinking activity.

Compounds where n is one can conveniently be prepared by the preferred process embodiment shown below:

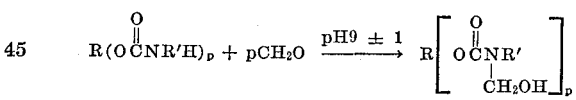

or

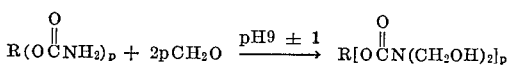

wherein:

R and p are as described above, and

R' is selected from the group consisting of hydrogen, hydroxyalkyl, alkoxy and alkyl.

The reaction is carried out by contacting a source of the formaldehyde such as a concentrated formaldehyde solution with the polycarbamate, preferably at alkaline pHs. An excess of the formaldehyde reactant is preferred over the amount required to produce the monomethylol or dimethylol product required by stoichiometry. The reaction can be operated at rear room temperature or at temperatures up to about 80° C. Higher reaction temperatures, between about 60 and 70° C. are efficient operating temperatures. Usually the reaction is complete within an hour of heating the reactants, although longer heating times generally are not harmful. Ordinarily the reaction mixture is heated until over 70% of the theoretical maximum degree of polymethylolation has occurred. At this time the pH is lowered to about 7.0±0.5 by the addition of an acid such as acetic or hydrochloric acid.

While formaldehyde solution is the preferred source of the hydroxymethyl radical, other sources such as paraformaldehyde can be employed if desired.

The N - (alkoxymethyl)- and N,N - bis(alkoxymethyl)-carbamates can be prepared by carrying out the polymethylolation reaction in the presence of the alcohol supplying the desired alkoxy radical, and controlling the pH of the reaction mixture so as to induce the methylolation reaction and ether formation at the appropriate time. For instance, by operating with methyl alcohol in the reaction mixture, methoxymethyl radicals can be introduced on the nitrogen atoms.

While all of the compositions having N-monostituted and N,N-disubstituted carbamate radicals are useful, as in any large group some members are preferred for a variety of reasons over the group at large. In this instance the preferred compositions are the tris and higher products in which at least one of the two carbamate hydrogens have been replaced by hydroxymethyl radicals of the formula:

$$HO-CH_2-$$

As indicated earlier these compositions are especially useful as modifying agents for textile substrates having a plurality of reactive hydroxyl groups.

Another class of useful crosslinking agents are alkoxymethyl derivatives wherein one or both of the carbamate hydrogens are replaced. The term "replaced" as used herein refers to an average degree of substitution wherein about 70% or more of the theoretically possible substitution has occurred.

These polymethylolated reagents have the advantage of being less costly to prepare than the corresponding alkoxymethyl compounds.

The textile substrates which can be modified by the polymethylolated reagents of this invention can be represented as:

$$Pol(OH)_n$$

wherein:

Pol is the abbreviation for polymeric materials such as cellulose and its derivatives, and $n$ represents the plurality of hydroxyl groups.

Among the many textile substrates having reactive OH groups which lend themselves to treatment with the N-substituted polycarbamate modifying agents are included:

Cellulosics such as cotton, linen, jute, flax, wood, paper, regenerated cellulose (as cuprammonium rayon, viscose rayon, and cellulosic film), hydroxyalkylcelluloses such as hydroxyethylcellulose and hydroxypropylcellulose, and the like. The term "cellulosic" as used herein is understood to include only those substrates which contain a minimum of 30% by weight of cellulose or its derivatives, preferably from 30% by weight and higher of the cellulose.

Additional useful substrates which can be modified by the polymethylolated carbamates of this invention include polyvinyl alcohol, partially hydrolyzed polyvinyl acetate and hydrolyzed copolymers of ethylene and vinyl acetate.

While the modifying processes of this invention are not predicated upon any particular reaction mechanism or sequence of steps, the following reaction is believed to be typical of the reactions that take place when a polymethylolated reagent of this invention, such as a penta-N-methylol derivative of glycerol tricarbonate is contacted with a cellulose-containing fabric. The cellulosic fabric is represented as Cell-OH.

Step 1

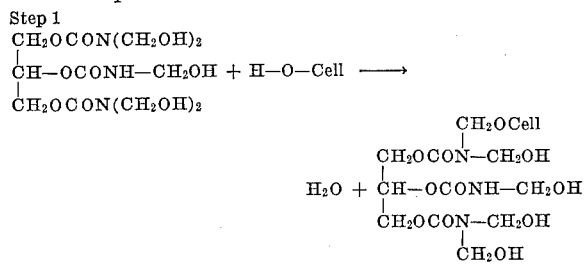

Step 2

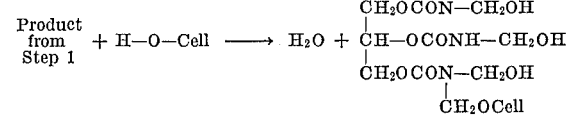

Step 3

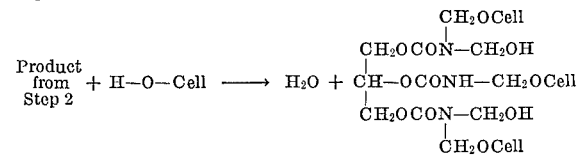

The polymethylol polycarbamates of this invention are exceptionally versatile reagents for treating textile substrates, particularly cellulosic fabrics, and are suitable for imparting permanent set to the treated fabric. Many different treatment techniques can be used including:

(1) Single-step deferred cure application to obtain permanently set articles such as crimped yarns, creased or pleated fabrics and garments.

(2) Single-step pre-cure application to obtain dimensionally stable cellulosic articles generally, and flat-drying cellulosic fabrics in particular.

(3) Two-step applications wherein the reagent is insolubilized during an initial reaction step, and thereafter caused to crosslink with the cellulosic fibers in a subsequent curing step. In the first step of such two-step applications, the reagent can be insolubilized in the presence of an acidic or a neutral catalyst and later caused to crosslink the cellulosic fibers in the presence of an acid or acid-forming catalyst.

Depending upon the treating technique used and the results sought various methods can be used to apply the polymethylolated carbamates and their activating catalysts to the textile substrate to be modified. These include, but are not limited to padding, brushing, dipping, spraying, coating and the like. The materials can be in the form of solutions, slurries, suspensions, pastes or gels where appropriate. To clarify each of the techniques and applications described supra the following more detailed discussion is submitted:

(1) SINGLE-STEP DEFERRED CURE APPLICATION

The approach known in the art as the deferred or delayed cure technique refers to a process wherein the cellulosic fabric is impregnated with a polyfunctional reagent and catalyst while at the textile mill. The crosslinking reaction is induced after the cellulosic textiles have been made up into garments or other manufactured goods. In one illustration of this technique, fabric is impregnated with a reagent containing 3 or more N-methylol-substituted carbamoyloxy radicals, along with a catalyst, dried at a temperature of approximately 60° C., and stored, if desired, for *deferred cure*. Then, for example, after garments are made, they are pressed and heated at the curing temperature, resulting in garments which have a durable set or permanent press, and which thus require minimum care because of flat-drying and no-ironing features.

The advantages of the compounds of the present invention for deferred cure application are demonstrated by low vapor pressure and their excellent stability to storage. Surprisingly, in spite of the multifunctionality and the fact that a suitably catalyzed formulation of the reagents applied on the textile is found to be stable to storage for a period of many months, reaction of the formulation in curing does not require severe curing conditions and setting of the treated article is accomplished by a heating cycle of a few minutes (2 to 20 minutes, for example) at moderate temperature (100° to 200° C., for example).

The amount of reagent required for setting by a single-step deferred cure process is of the order of 2% to 15% based on the weight of cellulose treated, amounts of 3% to 7% being preferred. Any acid or acid-forming salt can be used as a catalyst, and mineral acid salts of divalent metals are preferred.

(2) SINGLE-STEP CATALYZED PAD/CURE APPLICATION

This procedure is an *acid-catalyzed cure* because the accelerator or catalyst operative under curing conditions is generally an acid-generating compound, such as magnesium chloride or zinc tetrafluoroborate. Mineral acid salts of ammonia and amines, and organic acids can also be used. The solute of the pad bath consists of 2 essential components, viz., a polymethylol polycarbamate and the acid-generating catalyst. If magnesium chloride is used, between approximately 8 and 80 parts by weight of it should be used per 100 parts by weight of polymethylol polycarbamate.

It is convenient to use the polymethylol polycarbamate in the form of the neutralized aqueous reaction solution resulting from the polymethylolation reaction, filtered if necessary. The padding of the solution mixture onto the cellulosic fabric is done so as to impregnate the fabric with 2 to 20% of the reagent, based on the weight of cellulose in the fabric. The padded fabric is dried at a relatively moderate temperature, e.g., 50 to 70° C., then cured in the desired configuration for about 3 to 6 minutes at a high temperature, preferably higher than about 100° C. It has been found that temperatures in the range of 120 to 200° C. yield excellent results, although higher temperatures may be employed. When yarns are processed in continuous equipment, considerably higher temperatures of the order of 370 to 400° C. are employed because residence time is short. The sources of the heat which is applied to the textile material can be any one of conventional means, such as steaming, pressing or baking.

After the curing operation, the treated fabric is passed through a neutralizing solution, such as dilute sodium bicarbonate, and washed or rinsed. The resulting product is ready for use as a material with good wash-and-wear rating, having good crease recovery, dimensional stability and flat-drying properties. Polymethylol polycarbamates are reagents which upgrade fabrics to exceptional performance properties.

It is understood that the curing operations can be carried out regardless of the variation in padding operations, on fabric held in any desired configuration, whether flat, creased, pleated, folded, or the like. It is essential that the particular configuration is held or maintained throughout the curing operation, because flatness or folds imparted at that time to the fabric or garment become fixed in a durable, permanent manner. If the textile is held in a straight, smooth, or flat configuration during the heating step, the textile will be set in the flat condition.

Yarns containing cellulosic materials likewise can be processed by methods of this invention to have durable and essentially permanent configurations to them. For example, yarn treated with a polymethylol polycarbamate and other essential components such as catalysts or accelerators may be held in a twisted, bulked, crimped, or knitted configuration while heated to set or fix that configuration. By this process, a durable, permanent twist, bulk, or crimp can be imparted to the yarns. The twisting, bulking or crimping of the yarn can be imparted by any of the suitable commercial units available for such purpose.

(3) TWO-STEP APPLICATIONS

The polymethylol polycarbamates can be used to treat cellulosic materials in a two-step process. In the first step, the reagent is insolubilized without substantial crosslinking. That can be accomplished by a short cure or a neutral salt cure operation. The second step, or aftercure induces crosslinking and effects permanent set in the configuration in which the treated textile is held during curing.

A water-soluble acid can be used, such as citric acid, malic acid, or tartaric acid, for the short-cure insolubilization of polymethylol polycarbamates in lieu of the catalysts described previously. For instance, a 1 to 4% concentration of citric acid can be used in the pad bath, along with the polymethylol polycarbamate. Usually the best operative percentage of such acid is about ⅛ to ½ of the percentage of polymethylol polycarbamate. Fabric padded with such a mixture is then "short-cured" for merely 10 to 100 seconds at a temperature between 100 and 160° C. The fabric so processed can be passed through a neutralizing bath (as before), dried and thereafter be treated with a catalyst for the after-cure (as described in paragraph 5 below). At that stage, textile adjuvants such as softeners, can be added conveniently.

In lieu of an acid-generating salt or an organic acid, the pad bath may contain a neutral salt, such as sodium chloride, potassium chloride, sodium nitrate and the like. The preferred percentage of such salt is ½ to 1½ times the percentage of polymethylol polycarbamate. After padding, curing is effected at a high temperature, for instance at a temperature between 140 and 170° C. for 2 to 10 minutes.

In the presence of the neutral salt, cross-linking can be avoided even at this elevated temperature. The fabric so treated does not need to be, but can be washed. A catalyst for the aftercure (preferably a mineral acid salt of divalent metals such as zinc nitrate, magnesium chloride, and the like) is then deposited on the fabric with or without the addition of softeners, water repellents, and the like.

(4) AFTERCURE FOR FABRICS TREATED IN TWO-STEP PROCESSES

As a *second step* to "short cured" fabrics, or to fabrics cured in the presence of neutral salt, the partially treated fabric is re-padded with an acid-generating salt, such as, for example, magnesium chloride (0.1 to 1%). Fabric so re-processed is then dried at a mild temperature, such as 40 to 80° C. It can then be cured while being held in the desired configuration at a high temperature, such as 150 to 200° C., for 3 to 10 minutes, to permanently set the configuration and obtain the desired performance.

As indicated above, numerous techniques can be employed to apply the polymethylol polycarbamates to textile substrates and subsequently cure them. The examples which follow are illustrative of the preparation of representative intermediate polycarbamates of this application, their conversion to more reactive derivatives and the utilization of these derivatives as textile cross-linking agents.

EXAMPLE 1

Use of ammonia to synthesize pentaerythritol tetracarbamate

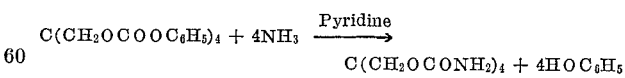

$$C(CH_2OCOOC_6H_5)_4 + 4NH_3 \xrightarrow{\text{Pyridine}} C(CH_2OCONH_2)_4 + 4HOC_6H_5$$

Excess ammonia gas is passed into a solution of 300 grams (0.487 mole) of pentaerythritol tetrakis(phenyl carbonate) in 1.25 liters of pyridine during a 2-hour period. The temperature of the exothermic reaction reaches a maximum of 52° C. The crystalline solid is filtered off and washed free of pyridine and by-product phenol, and the product recrystallized from 1500 ml. of N,N-dimethylformamide (initially hot) to which water (500 ml.) is subsequently added. The yield of dried product, pentaerythritol tetracarbamate, is 86 grams (59% based upon the tetracarbonate starting material); M.P. 271–273° C.

*Analysis.*—Required for $C_9H_{16}N_4O_8$ (percent): C, 42.8; H, 5.2; N, 18.15. Found (percent): C, 37.56; H, 5.26; N, 17.97.

EXAMPLE 2

Use of methylamine to synthesize pentaerythritol tetrakis-(N-methylcarbamate)

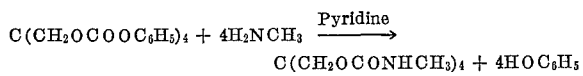

Excess methylamine is passed into a solution of 217 grams (0.352 mole) of pentaerythritol tetrakis(phenyl carbonate) in 750 ml. of pyridine during a 9-hour period at room temperature. The reaction mixture is kept at 45–50° C. for several more hours, and 1 liter of ethyl ether added to precipitate the product. The precipitate is filtered, washed twice with 200-ml. portions of ethyl ether and dried. The yield of dried product, pentaerythritol tetrakis(N-methylcarbamate), is 116 grams (91% based upon the tetracarbonate starting material), M.P. 255–258° C.

*Analysis.*—Required for $C_{13}H_{24}N_4O_8$ (percent): C, 42.8; H, 6.58; N, 15.4. Found (percent): C, 43.14; H, 6.60; N, 15.15.

EXAMPLE 3

Use of 2-aminoethanol to synthesize pentaerythritol tetrakis[N-(2-hydroxyethyl)carbamate]

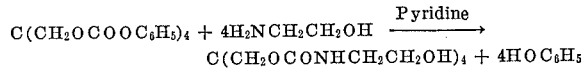

A solution of 234 grams (0.2 mole) of pentaerythritol tetrakis(phenyl carbonate) in 400 ml. of pyridine is added dropwise during a 90-minute period to 97.6 grams (1.6 mole) of 2-aminoethanol while stirring. The temperature of the exothermic reaction reaches 45° C. Afterwards the mixture is heated to 55–60° C. for 2 hours, acetone (1.2 liters) added, and the mixture chilled to promote crystallization. After filtering, the crystals are desiccated. The yield of product is 80 grams (82% based upon tetracarbonate starting material); M.P. 159–160° C. The 80-gram product is recrystallized from 650 ml. of 2-propanol, filtered, washed with ethyl ether, and desiccated, yielding 71 grams of product.

*Analysis.*—Required for $C_{17}H_{32}N_4O_{12}$ (percent): C, 42.25; H, 6.62; N, 11.58. Found (percent): C, 42.51; H, 6.69; N, 11.41.

EXAMPLE 4

Use of ammonia to synthesize 2-ethyl-2-(hydroxymethyl)-1,3-propanediol tricarbonate

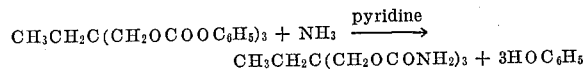

Excess ammonia gas is passed into a solution of 235 grams (0.475 mole) of 2-ethyl-2-(hydroxymethyl)-1,3-propanediol tris(phenyl carbonate) (prepared as in copending Ser. No. 563,064) in 1 liter of pyridine. The temperature of the exothermic reaction reaches 37° C. Then the mixture is heated to 75° C. for several hours and filtered. The precipitate is washed with ethyl ether and desiccated. The yield of product is 131 grams; M.P. 155–157° C. After recrystallization from 600 ml. of water and desiccation, the purified yield is 90.7 grams. This represents a yield of 58% based upon the tricarbonate starting material.

*Analysis.*—Required for $C_9H_{17}N_3O_6$ (percent): C, 41.1; H, 6.47; N, 15.96. Found (percent): C, 41.26; H, 6.37; N, 16.48.

EXAMPLE 5

Use of Ammonia to synthesize glycerol tricarbonate

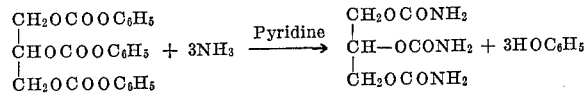

Excess ammonia gas is passed into a solution of 300 grams (0.663 mole) of glycerol tris(phenyl carbonate) in 1 liter of pyridine during a 2-hour period. After the addition is completed, the temperature of the reaction mixture is raised from 42° C. to 70° C. and 0.5 liter more of pyridine is added to reduce viscosity. Additional ammonia is passed into the diluted reaction mixture which is kept at 70° C. The reaction mixture is cooled and filtered and the crystals are washed with ethyl ether and dried. A 140-gram portion of product M.P. 170–172° C. is obtained. Recrystallization from 850 ml. of water, washing with ethyl alcohol, and desiccation produces 78 grams (a 46% yield of product based upon the tricarbonate starting material) of product M.P. 176–178° C.

*Analysis.*—Required for $C_6H_{11}N_3O_6$ (percent): C, 32.6; H, 4.9; N, 19.00. Found (percent): C, 32.99; H, 5.12; N, 19.27.

EXAMPLE 6

Use of methyl isocyanate to synthesize pentaerythritol tetrakis (N-methylcarbamate)

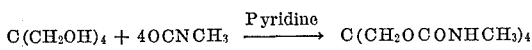

Methyl isocyanate (37 grams, 0.65 mole) is added dropwise to a stirred solution of 13.6 grams of pentaerythritol in 600 ml. of pyridine kept at room temperature. The reaction mixture is heated for 2 hours to the refluxing temperature, cooled and ethyl ether (500 ml.) added to precipitate the product. The precipitate is washed with ethyl ether and desiccated, yielding 24.8 grams (67% yield of product based upon the tetrol starting material) of pentaerythritol tetrakis(N-methyl carbamate); M.P. 246–248° C. A 10-gram portion of product is recrystallized from a solvent mixture of N,N-dimethylformamide (45 ml.) and water (15 ml.) to give 8.5 grams; M.P. 254–256° C. The M.P. is not depressed when the product of this example is mixed with that of Example 2 (made using methylamine), proving the identity of the products made by the two distinctly different reactions. Furthermore, infrared spectra are identical for the two preparations.

EXAMPLE 7

Use of methyl isocyanate to synthesize sorbital hexakis-(N-methylcarbamate)

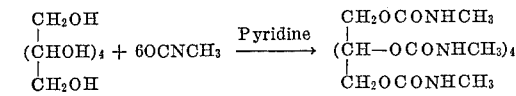

Methyl isocyanate (228 grams, 4.0 moles) is added dropwise during a 1-hour period to a stirred solution of 95.5 grams (0.5 mole) of sorbitol in 1,200 ml. of pyridine, initially at room temperature (25° C.). The reaction is continued with stirring while keeping the temperature below 35° C. The reaction mixture is then heated to reflux temperature for 30 minutes, kept at room temperature for 3 days, and filtered. The precipitate is washed with acetone and desiccated. The dried product which weighs 121 grams is recrystallized from 400 ml. of dimethyl sulfoxide to which 1 liter of water is added. The crystals are washed with acetone and dried. The yield of product is 42 grams (35% based upon the weight of hexol starting material); M.P. 269–270° C.

*Analysis.*—Required for $C_{18}H_{32}N_6O_{12}$ (percent): C, 41.2; H, 6.11; N, 16.0. Found (percent): C, 40.78; H, 6.55; N, 15.30.

EXAMPLE 8

Use of ammonia to synthesize the tricarbamate of the 2.93-mole propoxylate of glycerol

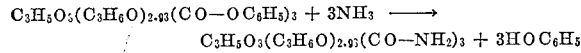

Excess ammonia gas is passed into a solution consisting of 1 liter of pyridine and 180 grams of the tris(phenyl carbonate) obtained from Example 5 of copending Ser. No. 563,064. During the addition of ammonia the temperature rises to 37° C., then subsides. The reaction mixture is heated to 60 to 70° C. for 8 hours, cooled to room temperature overnight, and 1 liter of hexane added. The supernatant liquid is decanted from the product, which precipitates as an oil.

The product is extracted with an additional liter of hexane, and then by 2 liters of ethyl ether. The resulting product is dissolved in chloroform and the solution filtered. The solvent is removed by distillation under reduced pressure until the product remaining behind attains constant weight. The product weighs 93 grams, which represents a yield of 82% based upon the carbonate starting material. The infrared spectrum of the product is consistent with the proposed structure.

EXAMPLE 9

Polymethylolation of pentaerythritol tetracarbamate

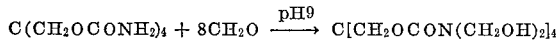

A reaction mixture of 80 grams (0.26 mole) of pentaerythritol tetracarbamate and 189 grams (2.3 moles) of a 37% aqueous solution of formaldehyde is adjusted to pH 9 with potassium carbonate. The reaction mixture is heated to 65–70° C. for 1 hour producing a clear solution, and the heating continued for an additional 6 hours. The reaction mixture is allowed to cool to room temperature overnight. The conversion to pentaerythritol tetrakis-[N,N-bis(hydroxymethyl)carbamate] is 85%, based on analysis of the unreacted formaldehyde remaining. The reaction mixture is brought to pH 7 by dilute acetic acid, filtered and analyzed for bound formaldehyde. The average number of hydroxymethyl radicals per N atom is found to be 1.7. The product contains hexamethylol and heptamethylol derivatives of pentaerythritol tetracarbamate as well as the main product of pentaerythritol tetrakis[N,N-bis(hydroxymethyl)carbamate].

EXAMPLE 10

Polymethylolation of pentaerythritol tetrakis (N-methylcarbamate)

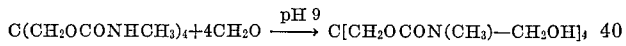

A reaction mixture of 100 grams (0.275 mole) of pentaerythritol tetrakis(N-methylcarbamate) and 111 grams 1.37 mole) of a 37% aqueous solution of formaldehyde is adjusted to pH 9 with potassium carbonate and heated to 70° C. for 2 hours, by which time the conversion to pentaerythritol tetrakis[N - (hydroxymethyl)-N-methylcarbamate] is 87%, based on unreacted formaldehyde. Dilute acetic acid is added to lower the pH to 7. The solution is analyzed for bound formaldehyde. On the average, the ratio of hydroxymethyl radicals to N atoms is 0.83. The principal components are pentaerythritol tetrakis[N-(hydroxymethyl)-N-methylcarbamate] and the trimethylol derivative of pentaerythritol tetrakis(N-methylcarbamate).

EXAMPLE 11

Polymethylolation of pentaerythritol tetrakis[N-(2-hydroxy-ethyl)-carbamate]

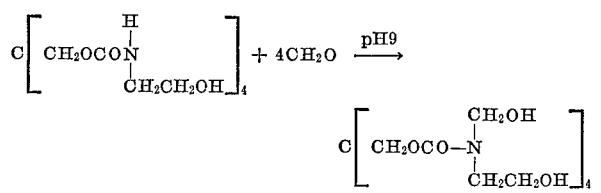

A reaction mixture of 67.8 grams (0.14 mole) of the above product obtained in Example 3 and 56.8 grams 0.70 mole) of a 37% aqueous solution of formaldehyde is adjusted to pH 9 with potassium carbonate and allowed to stand overnight. At that point, the conversion to pentaerythritol tetrakis[N-(hydroxyethyl)-N-hydroxymethyl)carbamate] is determined to be 75%. The reaction solution is heated for 4 hours at 65–70° C., bringing the conversion up to 81%, based on unreacted formaldehyde. Dilute acetic acid is added to lower the pH to 7. Analysis for bound formaldehyde shows that, on the average, the ratio of hydroxymethyl radicals to N atoms is 0.77. Principal components are pentaerythritol tetrakis-[N-(hydroxyethyl) - N - (hydroxymethylcarbamate] and the trimethylol derivative of pentaerythritol tetrakis[N-(2-hydroxyethyl)carbamate].

EXAMPLE 12

Polymethylolation of 2-ethyl-2-(hydroxymethyl)-1,3-propanediol tricarbamate

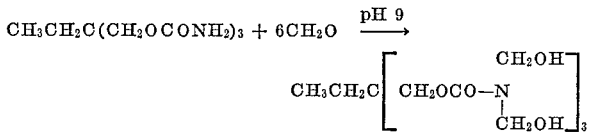

A reaction mixture of 90 grams (0.34 mole) of the above tricarbamate (Example 4) and 194 grams (2.40 moles) of a 37% aqueous solution of formaldehyde is adjusted to pH 9 with potassium carbonate and heated to 65–70° C. for several hours. During the first 15 minutes a clear solution results. After the reaction solution remains at room temperature overnight, the conversion to the hexamethylol tricarbamate is 82%, based on unreacted formaldehyde. Dilute acetic acid is added to bring the pH down to 7. Analysis for bound formaldehyde shows that, on the average, the ratio of hydroxymethyl radicals to N atoms is 1.66. Principal components are 2-ethyl-2-(hydroxymethyl) - 1,3 - propanediol tris[N,N-bis-(hydroxymethyl)carbamate] and the tetramethylol and pentamethylol derivatives of the initial tricarbamate.

EXAMPLE 13

Polymethylolation of glycerol tricarbamate

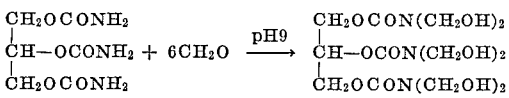

A reaction mixture of 75 grams (0.34 mole) of glycerol tricarbamate and 197 grams (2.43 moles) of a 37% aqueous solution of formaldehyde is adjusted to pH 9 with potassium carbonate. The reaction mixture is heated to 65–70° C. to produce a clear solution, and kept at that temperature for approximately 6 hours. After remaining at room temperature overnight, the conversion to glycerol tris[N,N-bis(hydroxymethyl)carbamate] is 83%, based on unreacted formaldehyde. Dilute acetic acid is added to lower the pH to 7. Analysis for bound formaldehyde shows that, on the average, the ratio of hydroxymethyl radicals to N atoms is 1.61. Principal components are glycerol tris[N,N-bis(hydroxymethyl)carbamate] and the tetramethylol and pentamethylol derivatives of glycerol tricarbamate.

EXAMPLE 14

Polymethylolation of sorbitol hexakis(N-methylcarbamate)

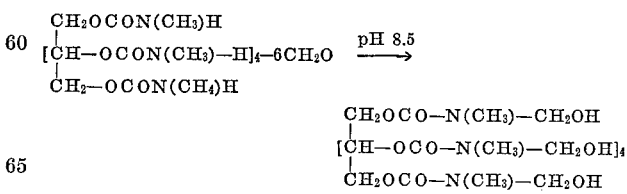

A reaction mixture of 40 grams (0.76 mole) of the product of Example 7 and 43.4 grams (0.534 mole) of a 37% agueous solution of formaldehyde is adjusted to pH 8.5 with potassium carbonate and heated to 75–82° C. for one hour.

Conversion to sorbital hexakis[N-(hydroxymethyl)-N-methylcarbamate] is 80%, based on unreacted formaldehyde. Dilute acetic acid is added to lower the pH to 6.9. Analysis for bound formaldehyde shows that, on the average, the ratio of hydroxymethyl radicals to N atoms is 0.73. Principal components are sorbitol hexakis[N-(hydroxymethyl)-N-methylcarbamate] and the tetramethylol and pentamethylol derivatives of sorbital hexakis(N-methylcarbamate).

EXAMPLE 15

Use of methyl isocyanate to synthesize a poly(N-methylcarbamate) of polyvinyl alcohol

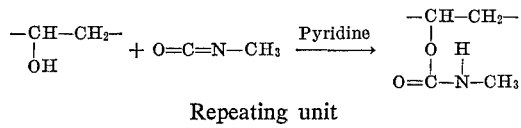

Repeating unit

Methyl isocyanate (140 grams, 2.44 moles) is added dropwise to a stirred solution of 100 grams (2.27 equivalents) of commercially obtained polyvinyl alcohol in 2 liters of pyridine at 20 to 25° C. After all of the methyl isocyanate is added, stirring is continued while the reaction mixture is heated at 65 to 70° C. for 6 hours. The reaction mixture is cooled to room temperature and treated with 2 liters of ethyl ether to precipitate the product. The oil which separates soon solidifies. The supernatant liquid is decanted off, and the solid extracted with 2 liters of cold ethyl ether in small portions. Large lumps are broken up, under ethyl ether, in a mortar, the ether is filtered off and the product dried in air. The yield of product is 116 grams which is a 48% yield based upon the polyvinyl alcohol starting material. The presence of the expected structural linkages is confirmed by infrared analysis. Analysis by combustion indicates that the degree of substitution (DS) is approximately 0.29. That is, approximately 29% of the repeating units undergo the reaction indicated by the above equation.

Analysis.—Required for DS-0.29 (percent): C, 52.6; H, 8.23; N, 4.04. Found (percent): C, 52.34; H, 8.44; N, 4.04.

EXAMPLE 16

Polymethylolation of the tricarbamate of proxylated glycerol

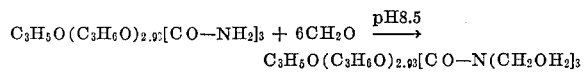

A reaction mixture of 90 grams (0.7 equivalent) of the product of Example 8 and 114 grams of a 37% aqueous solution of formaldehyde is adjusted to pH 8.5 by the addition of sodium carbonate and heated to 70° C. for 6 hours. The reaction mixture is allowed to cool to room temperature while standing overnight, neutralized by the addition of dilute acetic acid, filtered, and analyzed for bound formaldehyde (method: chromatropic acid, visible spectrum). The average number of hydroxymethyl radicals per N atom is found to be 2. That is, adjusted for nitrogen content, the conversion is 100% to the tris [N,N-bis(hydroxymethyl) carbamate] of the condensate of glycerol and 2.93 mole-parts of propylene oxide.

EXAMPLE 17

Polymethylolation of poly(N-methylcarbamate) of Polyvinyl alcohol

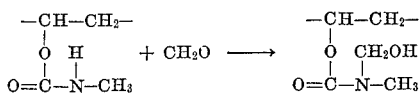

Substituted repeating unit

A reaction mixture of 101 grams of the product obtained in Example 15 and 82 grams of a 37% aqueous solution of formaldehyde is adjusted to pH 9 wtih potassiumcarbonate. The viscous mixture is thinned out by the addition of 100 ml. of water, and heated to 75 to 80° C. for 1 hour, to obtain a clear solution. The conversion of N-methylcarbamate radicals to N-(hydroxymethyl)-N-methylcarbamate radicals is 100%, based on analysis of formaldehyde. The reaction mixture is allowed to cool to room temperature and adjusted to pH 7 with dilute acetic acid. The number of hydroxymethyl radicals per N atom is 1, and the degree to which the hydroxyl radicals of the original polyvinyl alcohol is substituted by N-(hydroxymethyl)-N-methylcarbamate radicals is 0.29. The product is a sticky semi-solid.

The examples which follow show the use of various representative compounds of this invention as textile modifying agents. The data presented are obtained using the methods described below:

Crease recovery in angular degrees: Monsanto method, ASTM D-1295-60T.
Abrasion resistance (flex) in cycles: ASTM D-1175-61T; Stoll Flex Abrader, 0.5-lb. head, 2-lb. toggle.
Laundering: Home-type washer, 5–10-lb. load, full cycle, 60° C., synthetic detergent.
Crease retention: AATCC 88C-1964T. Scale: 1 (no crease left); 2 (slight crease), 4 (sharp crease), and 5 (unchanged very sharp crease).
Wash-and-wear rating: AATCC 88A-1964T. Scale: 1 (most seriously wrinkled) to 5 (perfectly smooth).
Tear strength in pounds: ASTM D1424-63.
Tensile strength in pounds: Ravel strip method, ASTM D1682-59T.
Damage caused by retained chlorine, in percentage of strength lost: AATCC 92-1962.
Acid hydrolysis: 1.5% phosphoric acid and 5% urea, 80° C. for 30 minutes; 1:30 fabric:liquor ratio.

Representative *blank* results on *untreated* plain weave cotton fabric (commonly known as 80 x 80 print cloth) are shown in the following table for 4 samples (W, X, Y and Z).

These results serve as a basis for comparison with results in the next 24 examples.

| Sample | Wash-wear rating | | | Crease recovery, degrees | | In warp direction | | | Damage, percent caused by retained chlorine |
|---|---|---|---|---|---|---|---|---|---|
| | Tumble dry | | Line dry, 5L | Dry | Wet | Strength, lb. | | Flex. abra. cycles | |
| | 1L | 5L | 10L | | | | Tensile | Tear | | |
| W | 1.0 | | | 1.0 | 195 | 163 | 58 | 1.7 | 650 | 4 |
| X | 1.0 | | | 1.0 | 189 | 161 | 61 | 1.7 | 420 | 3 |
| Y | 1.0 | | | 1.0 | 194 | 159 | 58 | 1.7 | 550 | 3 |
| Z | 1.0 | | | 1.0 | 186 | 157 | 58 | 1.6 | 500 | 3 |

The tabulated weight increase are corrected for change in moisture regain.

Percentage yields and nitrogen and bound formaldehyde contents are calculated assuming the loss of the maximum number of moles of water in the course of reaction with the cellulosic fabric.

The number of launderings (1, 5, or 10) is indicated by 1L, 5L, or 10L, respectively.

Under "tear strength," TAF means "torn across filling."

Data (percentages for moisture regain, weight gain, yield, nitrogen, and bound formaldehyde) for samples cured at 150° C. are similar to corresponding analytical data for samples cured at 170° C.

The letter "A" indicates which padding conditions applied (percentage of reagent padded on the fabric and acidity of the pad bath). The next digit "2" distinguishes between the curing conditions used in a particular set of experiments. If an "X" follows that digit, then the fabric samples are aftercured to complete the crosslinking. Specific conditions for "X" are described in certain examples.

EXAMPLE 18

Reagent:

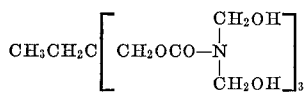

Procedure: Single application from neutral pad bath; coded "A" or "C," depending on amount of reagent on fabric.
Cure: $MgCl_2$—catalyzed; 150 and 170° C. compared (5 minutes); coded respectively "2" and "1."

Samples of plain-weave cotton fabric (commonly known as 80 x 80 print cloth) conditioned at a relative humidity (RH) of 65% and weighted on an analytical balance are impregnated from a pad bath prepared as follows: Accelerator MX (a product of American cyanamid Co., containing 65% magnesium chloride hexahydrate as the active ingredient) is added to reagent solution made in Example 12 in the following ratio. For each gram of *solute* in the reagent solution of Example 12, 0.7 gram of Accelerator MX *solution* is added. That is, the weight of Accelerator MX *solution* added is 70% of the weight of the above polymethylolated 2-ethyl-2-(hydroxymethyl)-1,3-propanediol tricarbamate. The impregnation is carried out by using a laboratory padder. Its rolls are set at the pressure which result in a wet pickup of 95–100%. The fabric samples so treated are dried at 60° C., and cured on a frame for 5 minutes in a forced-draft oven at either of the curing temperatures listed below. The cured samples are rinsed in a dilute solution of potassium bicarbonate, thoroughly washed in a solution of nonionic detergent, rinsed in water, and dried at 60° C. The treated samples are conditioned at 65% RH and weighed on an analytical balance. Treatment data are shown in the first section of the following table, and performance properties are in the second section of this table.

EXAMPLE 19

Reagent: Same as for Example 18.
Procedure: Single application from *acidified* pad bath; coded "B" or "D" depending on amount of reagent on fabric.
Cure: Same as for Example 18 ($MgCl_2$—catalyzed; 150 and 170° C. compared; 5 minutes; coded respectively "2" and "1").

The process details of Example 18 are repeated except that the pH of the reagent solution of the polymethylol tricarbamate is lowered to 3.5 with citric acid. Treatment data and performance properties are shown in the 2-section table which follows:

| Sample | Reagent, percent on weight of fabric | pH of pad bath | Curing temperature, °C. | Moisture regain, percent | Weight gain, percent corrected for moisture regain | Yield, percent | N, percent Found | N, percent Calculated from weight gain | HCHO, percent Found | HCHO, percent Calculated from weight gain |
|---|---|---|---|---|---|---|---|---|---|---|
| B1 | 7.2 | 3.2 | 170 | 5.3 | 7.4 | 100 | 0.86 | 0.86 | 2.23 | 3.71 |
| B2 | 7.1 | 3.2 | 150 | | | | | | | |
| D1 | 4.6 | 3.4 | 170 | 5.2 | 4.9 | 100 | 0.52 | 0.59 | 1.36 | 2.52 |
| D2 | 4.6 | 3.4 | 150 | | | | | | | |

| Sample | Wash-wear rating Tumble dry 1L | Wash-wear rating Tumble dry 5L | Wash-wear rating Tumble dry 10L | Wash-wear rating Line dry 5L | Crease recovery, degrees Dry | Crease recovery, degrees Wet | In warp Direction, Tensile strength | Damage, percent, caused by retained chlorine |
|---|---|---|---|---|---|---|---|---|
| B1 | 4.8 | 4.8 | 4.2 | 4.0 | 309 | 293 | 17 | None |
| B2 | 4.5 | 4.3 | 4.5 | 3.5 | 300 | 287 | 17 | 11 |
| D1 | 4.5 | 5.0 | 4.5 | 2.8 | 299 | 272 | 17 | 11 |
| D2 | 4.8 | 4.5 | 4.5 | 2.5 | 291 | 293 | 21 | None |

EXAMPLE 20

Reagent: Same as for Example 18.
First step: Citric acid (3%) also in pad bath; short cure (30 sec., 135° C.); coded "F3."
Second step: Re-pad with $MgCl_2$; after-cure (5 minutes at 170° C.); suffix "X" after "F3."

First step

Samples of plain-weave cotton fabric (commonly known as 80 x 80 print cloth) are conditioned at 65% RH, weighed on an analytical balance and impregnated with an aqueous solution (7–8%) obtained in Example 12, containing 3%, by weight, of citric acid. The treatment is carried out using a laboratory padder whose rolls are set at the pressure which results in a wet pickup of 95–100%. The fabric samples so treated are *"short cured"* at 135° C. for 30 seconds in a forced-draft oven.

The short cured samples are neutralized in a dilute solution of potassium bicarbonate, rinsed in water, and dried on frames at 60° C. The samples are conditioned at 65% RH and weighed on an analytical balance. Treatment data and performance properties are shown in the 2-section table which follows. (The samples are coded F3.)

| Sample | Reagent, percent on weight of fabric | pH of pad bath | Curing temperature, °C. | Moisture regain, percent | Weight gain percent corrected for moisture regain | Yield, percent | N, percent Found | N, percent Calculated from weight gain | HCHO, percent Found | HCHO, percent Calculated from weight gain |
|---|---|---|---|---|---|---|---|---|---|---|
| A1 | 7.3 | 7.0 | 170 | 5.3 | 6.8 | 100— | 0.72 | 0.78 | .187 | 3.42 |
| A2 | 7.1 | 7.0 | 150 | | | | | | | |
| C1 | 4.6 | 6.7 | 170 | 5.4 | 4.7 | 100 | 0.64 | 0.56 | 1.46 | 2.39 |
| C2 | 4.6 | 6.7 | 150 | | | | | | | |

| Sample | Wash-wear rating Tumble dry 1L | Wash-wear rating Tumble dry 5L | Wash-wear rating Tumble dry 10L | Line dry 5L | Crease recovery, degrees Dry | Crease recovery, degrees Wet | In warp direction Strength, lb. Tensile | In warp direction Strength, lb. Tear | Flex Abrader, cycles | Damage, percent caused by retained chlorine | Loss of added weight, percent in acid hydrolysis |
|---|---|---|---|---|---|---|---|---|---|---|---|
| A1 | 4.8 | 5.0 | 4.5 | 4.0 | 288 | 278 | 24 | 0.7 | 75 | 7 | 18 |
| A2 | 4.5 | 4.5 | 4.5 | 2.5 | 284 | 272 | 29 | 0.9 | 150 | 6 | |
| C1 | 4.3 | 5.0 | 4.5 | 3.5 | 289 | 268 | 27 | TAF | 125 | None | |
| C2 | 4.0 | 4.3 | 4.0 | 1.0 | 270 | 258 | 32 | TAF | 270 | None | |

Note: In this and subsequent tables, samples having a suffix "X" are explained in connection with the *second* step of this 2-step procedure. Furthermore, sample codes with an E (in lieu of F) are related to the next-numbered example.

135° C. for 30 seconds). Treatment data and performance properties of the samples (coded E1 and E1X) are shown in the 2-section table in preceding Example 20. Note that the suffix "X" on the sample code number refers to the operation of the *second step* (re-padding with magnesium

| Sample | Reagent, percent on weight of fabric | Catalyst | Curing temperature °C. | Moisture, regain, percent | Weight gain, percent corrected for moisture regain | N, percent | | HCHO, percent | |
|---|---|---|---|---|---|---|---|---|---|
| | | | | | | Found | Calculated from weight gain | Found | Calculated from weight gain |
| F3 | 7.3 | 3% Citric | 135, 30" | 5.9 | 6.1 | 0.73 | 0.72 | 1.67 | 3.10 |
| E1 | 7.3 | 6% NaCl | 150, 5' | 6.5 | 2.1 | 0.41 | 0.25 | 0.57 | 10.9 |

| Sample | Wash-wear rating | | | | Crease recovery, degrees | | In warp direction | | Flex Abrader, cycles | Damage, percent caused by retained chlorine | Loss of added weight, percent in acid hydrolysis |
|---|---|---|---|---|---|---|---|---|---|---|---|
| | Tumble dry | | | Line dry | | | Strength, lb. | | | | |
| | 1L | 5L | 10L | 5L | Dry | Wet | Tensile | Tear | | | |
| F3 | | | | | 236 | 251 | | | | 82 | |
| F3X | 4.0 | 4.5 | 4.0 | 2.3 | 293 | 278 | 16 | TAF | 20 | 6 | 21 |
| E1 | | | | | 192 | 184 | | | | 88 | |
| E1X | 3.0 | 3.5 | 4.0 | 1.0 | 249 | 248 | 25 | 0.8 | 135 | 42 | |

Second step

The "short cured" samples are padded with 3% of an aqueous magnesium chloride solution obtained by diluting a concentrated (65% by weight) solution of magnesium hexahydrate with water. The padding is done by setting the rolls of the padder at the pressure to give a wet pickup of 95–100%. The samples so treated are dried at 60° C., then cured at 170° C. for 5 minutes in a forced-draft oven. These "*after-cured*" samples are neutralized in a dilute solution of potassium bicarbonate, washed in a solution of nonionic detergent at 60° C., rinsed in water, and dried at 60° C. Performance properties of the samples (coded F3X) are shown in the second section of the *above* table.

EXAMPLE 21

Reagent: Same as for Example 18.
First step: NaCl (6%) also in pad bath; 5-minute cure at at 150° C.; Coded "E1."

Second step: Same as in Example 20 (MgCl₂; after-cured 5 min. at 170° C.); suffix "X" after "E1."

The procedural details of Example 20 are repeated with 2 exceptions in the first step, viz., (2) the 3%, by weight, citric acid in the pad bath is replaced by 6%, by weight, of sodium chloride and (b) the fabric samples are cured at 150° C. for 5 minutes (in lieu of the "short cure" at chloride, and after-curing for 5 minutes at 170° C. to complete the crosslinking).

EXAMPLE 22

Reagent:

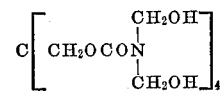

Procedure: Single application from *neutral* pad bath as in Example 18; coded "A" or "C" depending on amount of reagent on fabric.
Cure: MgCl₂—catalyzed; 150 and 170° C. compared (5 minutes); coded respectively "2" and "1."

The process of Example 18 is followed except that the polymethylolated compound of pentaerythritol tetracarbamate derived from Example 9 is used. Treatment data and performance properties are shown in the following 2-section table.

| Sample | Reagent, percent on weight of fabric | pH of pad bath | Curing temperature, °C. | Moisture regain, percent | Weight gain, percent corrected for moisture regain | Yield, percent | N, percent | | HCHO, percent | |
|---|---|---|---|---|---|---|---|---|---|---|
| | | | | | | | Found | Calculated from weight gain | Found | Calculated from weight gain |
| A1 | 7.1 | 6.8 | 170 | 5.6 | 6.7 | 100 | 0.54 | 0.87 | 1.53 | 3.75 |
| A2 | 7.2 | 6.8 | 150 | | | | | | | |
| C1 | 4.6 | 6.8 | 170 | 5.3 | 6.3 | 100 | 0.61 | 0.82 | 1.87 | 3.53 |
| C2 | 4.6 | 6.8 | 150 | | | | | | | |

| Sample | Wash-wear rating | | | | Crease recovery, degrees | | In warp direction | | Flex Abrader, cycles | Damage, percent caused by retained chlorine | Loss of added weight, percent in acid hydrolysis |
|---|---|---|---|---|---|---|---|---|---|---|---|
| | Tumble dry | | | Line dry | | | Strength, lb. | | | | |
| | 1L | 5L | 10L | 5L | Dry | Wet | Tensile | Tear | | | |
| A1 | 4.8 | 4.5 | 4.8 | 4.5 | 300 | 264 | 28 | TAF | 100 | 3 | 12 |
| A2 | 4.5 | 4.8 | 4.8 | 3.5 | 287 | 263 | 32 | 0.9 | 120 | 3 | |
| C1 | 4.8 | 4.8 | 4.8 | 3.8 | 298 | 270 | 27 | 0.8 | 95 | 9 | |
| C2 | 4.5 | 4.8 | 4.8 | 4.5 | 288 | 266 | 34 | TAF | 225 | 11 | |

EXAMPLE 23

Reagent: Same as for Example 22.
Procedure: Single application from acidified pad bath as in Example 19; coded "B" or "D" depending on amount of reagent on fabric.
Cure: Same as for Example 22 (MgCl₂-catalyzed; 150 and 170° C. compared; 5 minutes; coded respectively "2" and "1").

The process of Example 22 is followed except that the pH of the reagent solution of the polymethylol compound of pentaerythritol tetracarbamate is lowered to 3.7 with citric acid. Treatment data and performance properties are shown in the 2-section table which follows:

Second step: Same as in Example 24 (MgCl₂; after-cured 5 minutes at 170° C.); suffix "X" after "E1."

The process of Example 24 is repeated with 2 exceptions in the first step, viz., (a) the 3%, by weight, citric acid in the pad bath is replaced by 6%, by weight, of

| Sample | Reagent, percent on weight of fabric | pH of pad bath | Curing temperature, °C. | Moisture regain, percent | Weight gain, percent corrected for moisture regain | Yield, percent | N, percent Found | N, percent Calculated from weight gain | HCHO, percent Found | HCHO, percent Calculated from weight gain |
|---|---|---|---|---|---|---|---|---|---|---|
| B1 | 7.2 | 3.7 | 170 | 5.2 | 6.8 | 100 | 0.58 | 0.88 | 1.69 | 3.79 |
| B2 | 7.1 | 3.7 | 150 | | | | | | | |
| D1 | 4.5 | 3.7 | 170 | 5.3 | 4.5 | 100 | 0.35 | 0.60 | 1.14 | 2.56 |
| D2 | 4.6 | 3.7 | 150 | | | | | | | |

| Sample | Wash-wear rating Tumble dry 1L | Wash-wear rating Tumble dry 5L | Wash-wear rating Tumble dry 10L | Wash-wear rating Line dry 5L | Crease recovery, degrees Dry | Crease recovery, degrees Wet | Damage, percent caused by retained chlorine | Loss of added weight, percent in acid hydrolysis |
|---|---|---|---|---|---|---|---|---|
| B1 | 4.5 | 4.5 | 4.5 | 4.3 | 308 | 282 | 7 | 15 |
| B2 | 5.0 | 4.5 | 4.3 | 4.3 | 299 | 285 | None | |
| D1 | 4.0 | 4.3 | 4.3 | 3.5 | 300 | 274 | 20 | |
| D2 | 4.5 | 4.3 | 4.3 | 4.3 | 303 | 272 | None | |

EXAMPLE 24

Reagent: Same as for Example 22.
First step: Citric acid (3%) also in pad bath; short cure (30 sec., 135° C.); coded "F3."
Second step: Re-pad with MgCl₂; after-cure (5 minutes at 170° C.); suffix "X" after "F3."

First step

The process of Example 20 is followed except that the polymethylolated compound pentaerythritol tetracarbamate of Example 9 is used. See the following values for Sample F3.

Second step

The same as for second step of Example 20. See the following values for Sample F3X. (The procedure on Samples E1 and E1X, is shown in Example 25).

sodium chloride, a neutral salt, and (b) the fabric samples are cured at 150° C. for 5 minutes (in lieu of the "short cure"). Treatment data and performance properties of the samples (E1 and E1X) are shown above in the 2-section table of Example 24.

EXAMPLE 26

Reagent:

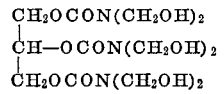

Procedure: *Single* application from *neutral* pad bath (analogous to Example 18); coded "A" or "C" depending on amount of reagent on fabric.

| Sample | Reagent, percent on weight of fabric | Catalyst | Curing temperature °C | Moisture, regain, percent | Weight gain, percent corrected for moisture regain | N, percent Found | N, percent Calculated from weight gain | HCHO, percent Found | HCHO, percent Calculated from weight gain |
|---|---|---|---|---|---|---|---|---|---|
| F3 | 7.3 | 3% citric | 135, 30" | 5.8 | 7.8 | 0.63 | 1.01 | 1.77 | 4.32 |
| E1 | 7.5 | 6% NaCl | 150, 5' | 6.8 | 2.4 | 0.19 | 0.32 | 0.63 | 1.38 |

| Sample | Wash-wear rating Tumble dry 1L | Wash-wear rating Tumble dry 5L | Wash-wear rating Tumble dry 10L | Wash-wear rating Line dry 5L | Crease recovery, degrees Dry | Crease recovery, degrees Wet | In warp direction Strength, lb. Tensile | In warp direction Strength, lb. Tear | In warp direction Flex Abrader, cycles | Damage, percent caused by retained chlorine | Loss of added weight, percent in acid hydrolysis |
|---|---|---|---|---|---|---|---|---|---|---|---|
| F3 | | | | | 256 | 260 | | | | 83 | |
| F3X | 4.3 | 4.0 | 4.0 | 4.3 | 302 | 281 | 13 | TAF | 15 | None | 20 |
| E1 | | | | | 200 | 188 | | | | 87 | |
| E1X | 4.3 | 4.0 | 4.0 | 3.0 | 271 | 256 | 26 | 0.8 | 135 | 21 | |

EXAMPLE 25

Reagent: Same as for Example 22.
First step: NaCl (6%) also in pad bath; 5-minute cure at 150° C., coded "E1."
Cure: MgCl₂—catalyzed; 150 and 170° C. compared (5 minutes); coded respectively "2" and "1."

The process of Example 18 is followed except that the polymethylolated glycerol tricarbamate product of Example 13 is used as the reagent. Treatment date and performance properties are shown in the following 2-section table:

Second step: Re-pad with MgCl₂; after-cure (5 minutes at 170°), suffix "X" after "F3."

| Sample | Reagent, percent on weight of fabric | pH of pad bath | Curing temperature, °C. | Moisture regain, percent | Weight gain, percent corrected for moisture regain | Yield, percent | N, percent Found | N, percent Calculated from weight gain | HCHO, percent Found | HCHO, percent Calculated from weight gain |
|---|---|---|---|---|---|---|---|---|---|---|
| A1 | 7.3 | 6.9 | 170 | 5.5 | 6.5 | 100− | 0.52 | 0.88 | 1.42 | 3.77 |
| A2 | 7.2 | 6.9 | 150 | | | | | | | |
| C1 | 4.7 | 6.7 | 170 | 5.5 | 4.2 | 100 | 0.37 | 0.58 | 1.40 | 2.47 |

| Sample | Wash-wear rating Tumble dry 1L | 5L | 10L | Wash-wear rating Line dry 5L | Crease recovery, degrees Dry | Crease recovery, degrees Wet | In warp direction Strength, lb. Tensile | In warp direction Strength, lb. Tear | Flex. Abrader, cycles | Damage, percent caused by retained chlorine | Loss of added weight, percent in acid hydrolysis |
|---|---|---|---|---|---|---|---|---|---|---|---|
| A1 | 5.0 | 5.0 | 4.8 | 4.5 | 285 | 274 | 22 | 0.7 | 100 | 3 | None. |
| A2 | 4.3 | 4.0 | 4.3 | 4.0 | 280 | 268 | 35 | 1.0 | 225 | 40 | |
| C1 | 4.8 | 4.8 | 4.8 | 4.5 | 273 | 267 | 28 | 0.9 | 150 | 22 | |
| C2 | 4.0 | 4.0 | 4.0 | 3.0 | 265 | 247 | 34 | 1.0 | 220 | 83 | |

EXAMPLE 27

Reagent: Same as for Example 26.
Procedure: Single application from acidified path bath analogous to Example 19; coded "B" and "D" depending on amount of reagent on fabric.
Cure: Same as for Example 26 (MgCl₂—catalyzed; 150 and 170° C. compared; 5 minutes; coded respectively "2" and "1").

The process of Example 26 is followed except that the pH of the reagent solution is lowered to 3.6 with citric acid. Treatment data and performance properties are shown in the 2-section table which follows:

| Sample | Reagent, percent on weight of fabric | pH of pad bath | Curing temperature, °C. | Moisture regain, percent | Weight gain, percent corrected for moisture regain | Yield, percent | N, percent Found | N, percent Calculated from weight gain | HCHO, percent Found | HCHO, percent Calculated from weight gain |
|---|---|---|---|---|---|---|---|---|---|---|
| B1 | 7.3 | 3.6 | 170 | 5.4 | 7.4 | 100 | 0.60 | 0.99 | 2.08 | 4.25 |
| B2 | 7.2 | 3.6 | 150 | | | | | | | |
| D1 | 4.6 | 3.6 | 170 | 5.2 | 4.8 | 100 | 0.45 | 0.66 | 1.67 | 2.84 |
| D2 | 4.7 | 3.6 | 150 | | | | | | | |

| Sample | Wash-wear rating Tumble dry 1L | 5L | 10L | Wash-wear rating Line dry 5L | Crease recovery, degrees Dry | Crease recovery, degrees Wet | Damage, percent caused by retained chlorine | Loss of added weight, percent in acid hydrolysis |
|---|---|---|---|---|---|---|---|---|
| B1 | 5.0 | 4.5 | 4.5 | 5.0 | 306 | 291 | 5 | None. |
| B2 | 4.8 | 4.5 | 4.8 | 5.0 | 298 | 291 | 17 | |
| D1 | 4.3 | 4.3 | 4.0 | 4.3 | 206 | 284 | 10 | |
| D2 | 4.8 | 5.0 | 4.5 | 4.0 | 298 | 275 | 4 | |

EXAMPLE 28

Reagent: Same as for Example 26.
First step: Citric acid (3%) also in pad bath; short cure (30 sec., 135° C.) coded "F3."

First step

The process of Example 20 is followed except that the polymethylolated glycerol tricarbamate of Example 13 is used. The resulting sample is coded F3.

Second step

Analogous to the second step of Example 20, the resulting sample is coded F3X.

| Sample | Reagent, percent on weight of fabric | Catalyst | Curing temperature °C. | Moisture, regain, percent | Weight gain, percent corrected for moisture regain | N, percent Found | N, percent Calculated from weight gain | HCHO, percent Found | HCHO, percent Calculated from weight gain |
|---|---|---|---|---|---|---|---|---|---|
| F3 | 7.3 | 3% citric | 135, 30″ | 6.1 | 5.5 | 0.60 | 0.74 | 1.72 | 3.19 |
| E1 | 7.3 | 6% NaCl | 150, 5′ | 6.2 | 2.8 | 0.22 | 0.39 | 1.25 | 1.66 |

| Sample | Wash-wear rating Tumble dry 1L | 5L | 10L | Wash-wear rating Line dry 5L | Crease recovery, degrees Dry | Crease recovery, degrees Wet | In warp direction Strength, lb. Tensile | In warp direction Strength, lb. Tear | Flex Abrader, cycles | Damage, percent caused by retained chlorine | Loss of added weight, percent in acid hydrolysis |
|---|---|---|---|---|---|---|---|---|---|---|---|
| F3 | | | | | 234 | 234 | | | | 85 | |
| F3X | 4.3 | 4.0 | 4.0 | 3.5 | 291 | 267 | 17 | TAF | 40 | 5 | 18 |
| E1 | | | | | 198 | 204 | | | | 87 | |
| E1X | 4.0 | 4.0 | 3.5 | 2.5 | 265 | 257 | 27 | 0.8 | 375 | 72 | |

EXAMPLE 29

Reagent: Same as for Example 26.
First step: NaCl (6%) also in pad bath; 5-minute cure at 150° C.; coded "E1."
Second step: Same as in Example 28 (MgCl₂; after-cured 5 minutes at 170° C.); suffix "X" after "E1."

The process of Example 28 is repeated with 2 exceptions in the first step, viz, (a) the pad bath contains 6%, by weight, sodium chloride, a neutral salt rather than 3%, by weight, of citric acid, and (b) the fabric samples are cured at 150° C. for 5 minutes (in lieu of the "short cure"). Treatment data and performance properties of the samples (E1 and E1X) are shown in the 2-section table in above Example 28.

EXAMPLE 30

Reagent:

Procedure: *Single* application from *neutral* pad bath (as in Example 18); coded "A" or "C" depending on amount of reagent on fabric.

Cure: MgCl$_2$-catalyzed; 150 and 170° C. compared (5 minutes); coded respectively "2" and "1."

The process of Example 18 is followed except that the reagent solution contained the polymethylolation product of pentaerythritol tetrakis-(N-methylcarbamate), described in Example 10. Treatment data and performance properties are shown in the following 2-section table.

Cure: Same as for Example 30 (MgCl$_2$-catalyzed; 150 and 170° C. compared; 5 minutes; coded respectively "2" and "1").

The process of Example 30 is followed except that the pH of the reagent solution of the polymethylolated pentaerythritol tetrakis(N-methylcarbamate) product is lowered to 3.5–3.6 with citric acid. Treatment data and performance properties are shown in the 2-section table which follows:

| Sample | Reagent, percent on weight of fabric | pH of pad bath | Curing temperature, °C. | Moisture regain, percent | Weight gain, percent corrected for moisture regain | Yield, percent | N, percent Found | N, percent Calculated from weight gain | HCHO, percent Found | HCHO, percent Calculated from weight gain |
|---|---|---|---|---|---|---|---|---|---|---|
| B1 | 6.8 | 3.6 | 170 | 5.1 | 7.1 | 100 | 0.36 | 0.89 | 1.20 | 1.92 |
| B2 | 6.7 | 3.6 | 150 | | | | | | | |
| D1 | 4.8 | 3.5 | 170 | 5.4 | 4.3 | 100 | | | | |
| D2 | 4.8 | 3.5 | 150 | | | | | | | |

| Sample | Wash-wear rating Tumble dry 1L | 5L | 10L | Wash-wear rating Line dry 5L | Crease recovery, degrees Dry | Crease recovery, degrees Wet | Damage, percent caused by retained chlorine | Loss of added weight, percent in acid hydrolysis |
|---|---|---|---|---|---|---|---|---|
| B1 | 4.3 | 3.8 | 3.8 | 2.0 | 284 | 282 | 10 | 27 |
| B2 | 4.5 | 4.5 | 4.5 | 3.5 | 280 | 277 | 8 | |
| D1 | 3.5 | 3.5 | 3.5 | 2.5 | 278 | 270 | 11 | |
| D2 | 4.0 | 3.8 | 3.8 | 2.0 | 287 | 267 | None | |

EXAMPLE 32

Reagent: Same as for Example 30.

First step: Citric acid (3%) also in pad bath; short cure (30 sec., 135° C.); coded "F3."

Second step: Re-pad with MgCl$_2$; after-cure (5 minutes at 170° C); suffix "X" after "F3."

First step

The process of Example 20 is followed except that the polymethylolated pentaerythritol tetrakis(N-methylcar-

| Sample | Reagent, percent on weight of fabric | pH of pad bath | Curing temperature, °C. | Moisture regain, percent | Weight gain, percent corrected for moisture regain | Yield, percent | N, percent Found | N, percent Calculated from weight gain | HCHO, percent Found | HCHO, percent Calculated from weight gain |
|---|---|---|---|---|---|---|---|---|---|---|
| A1 | 6.5 | 6.5 | 170 | 5.3 | 6.8 | 100 | 0.38 | 0.86 | 1.11 | 1.85 |
| A2 | 6.9 | 6.5 | 150 | | | | | | | |
| C1 | 4.6 | 6.5 | 170 | 5.5 | 4.5 | 100 | | | | |
| C2 | 4.5 | 6.3 | 150 | | | | | | | |

| Sample | Wash-wear rating Tumble dry 1L | 5L | 10L | Line dry 5L | Crease recovery, degrees Dry | Wet | In warp direction Strength, lb. Tensile | Tear | Flex Abrader, cycles | Damage, percent caused by retained chlorine | Loss of added weight, percent in acid hydrolysis |
|---|---|---|---|---|---|---|---|---|---|---|---|
| A1 | 5.0 | 5.0 | 4.8 | 2.0 | 283 | 262 | 32 | 0.8 | 100 | None | 37 |
| A2 | 4.8 | 4.5 | 4.5 | 1.0 | 281 | 259 | 32 | 0.9 | 100 | None | |
| C1 | 4.8 | 4.5 | 4.8 | 1.5 | 277 | 265 | 23 | TAF | 55 | 4 | |
| C2 | 4.5 | 4.5 | 4.3 | 2.5 | 276 | 255 | 29 | 0.8 | 150 | None | |

EXAMPLE 31

Reagent: Same as for Example 30.

Procedure: Single application from acidified pad bath as in Example 19; coded "B" and "C" depending on amount of reagent on fabric.

bamate) produced is used as the reagent. The resulting fabric sample is coded F3.

Second step

Analogous to the second step of Example 20, the resulting sample is coded F3X. (See Example 33 for the procedure leading to samples E1 and E1X).

| Sample | Reagent, percent on weight of fabric | Catalyst | Curing temperature, °C. | Moisture regain, percent | Weight gain, percent corrected for moisture regain | N, percent Found | N, percent Calculated from weight gain | HCHO, percent Found | HCHO, percent Calculated from weight gain |
|---|---|---|---|---|---|---|---|---|---|
| F3 | 7.3 | 3% citric | 135, 30" | 5.8 | 6.4 | 0.30 | 0.82 | 0.91 | 1.75 |
| E1 | 7.2 | 6% NaCl | 150, 5' | 6.9 | 1.6 | 0.07 | 0.22 | 0.17 | 0.47 |

| Sample | Wash-wear rating Tumble dry 1L | 5L | 10L | Line dry 5L | Crease recovery, degrees Dry | Wet | In warp direction Strength, lb. Tensile | Tear | Flex Abrader, cycles | Damage, percent caused by retained chlorine | Loss of added weight, percent in acid hydrolysis |
|---|---|---|---|---|---|---|---|---|---|---|---|
| F3 | | | | | 232 | 236 | | | 350 | 7 | |
| F3X | 3.5 | 3.3 | 3.5 | 1.0 | 285 | 267 | 14 | TAF | 25 | 8 | 33 |
| E1 | | | | | 208 | 183 | | | 450 | 26 | |
| E1X | 1.5 | 1.5 | 2.0 | 1.0 | 238 | 222 | 27 | 0.7 | 100 | 4 | |

EXAMPLE 33

Reagent: Same as for Example 30.

First step: NaCl (6%) also in pad bath; 5-minute cure at 150° C.; coded "E1."

Second step: Same as in Example 32 (MgCl$_2$; after-cured 5 minutes at 170° C.); suffix "X" after "E1."

The process of Example 32 is repeated with 2 exceptions in the first step, viz, (2) the 3%, by weight, citric acid in the pad bath is replaced with 6%, by weight, of sodium chloride, and (b) the fabric samples are cured at 150° C. for 5 minutes (in lieu of the "short cure"). Treatment data and performance properties of the samples (E1 and E1X) are shown in the 2-section table above in Example 32.

EXAMPLE 34

Reagent:

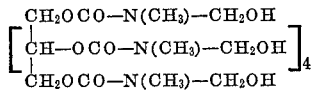

Procedure: Single application from neutral pad bath (as in Example 18); coded "A."

Cure: MgCl$_2$-catalyzed; 150 and 170° C. compared (5 minutes); coded respectively "2" and "1."

The process of Example 18 is followed except that the polymethylolated sorbitol hexakis(N-methylcarbamate) product is used as the reagent. Treatment data and performance properties are shown in the following 2-section table.

EXAMPLE 35

Reagent: Same as for Example 34.

Procedure: Single application from *acidified pad* bath (as in Example 19); coded "B."

Cure: Same as for Example 31 (MgCl$_2$-catalyzed; 150 and 170° C. compared; 5 minutes; coded respectively "2" and "1."

The process of Example 34 is followed except that the pH of the reagent solution of the polymethylolated sorbitol hexakis(N-methylcarbamate) product is lowered to 3.7 with citric acid. Treatment data and performance properties are shown in the 2-section table which follows:

| Sample | Reagent, percent on weight of fabric | pH of pad bath | Curing temperature, °C. | Moisture regain, percent | Weight gain, percent corrected for moisture regain | Yield, percent | N, percent Found | Calculated from weight gain | HCHO, percent Found | Calculated from weight gain |
|---|---|---|---|---|---|---|---|---|---|---|
| B1 | 7.4 | 3.7 | 170 | 6.0 | 8.5 | 100 | 0.72 | 1.10 | 1.52 | 2.36 |
| B2 | 7.2 | 3.7 | 150 | | | | | | | |

| Sample | Wash-wear rating Tumble dry 1L | 5L | 10L | Line dry 5L | Crease recovery, degrees Dry | Wet | Damage, percent caused by retained chlorine | Loss of added weight, percent in acid hydrolysis |
|---|---|---|---|---|---|---|---|---|
| B1 | 4.8 | 4.5 | 4.8 | 3.0 | 296 | 273 | None | 36 |
| B2 | 4.8 | 4.5 | 4.3 | 2.0 | 297 | 274 | None | |

EXAMPLE 36

Reagent: Same as for Example 34.

First step: Citric acid (3%) also in pad bath, short cure (30 sec., 135%).

Second step: Re-pad with MgCl$_2$; after-cure (5 minutes at 170° C.); suffix "X" after "D3."

First step

The process of Example 20 is followed except that the polymethylolated sorbitol hexakis(N-methylcarbamate) product is used as the reagent. The resulting fabric sample is coded D3.

| Sample | Reagent, percent on weight of fabric | pH of pad bath | Curing temperature, °C. | Moisture regain, percent | Weight gain, percent corrected for moisture regain | Yield, percent | N, percent Found | Calculated from weight gain | HCHO, percent Found | Calculated from weight gain |
|---|---|---|---|---|---|---|---|---|---|---|
| A1 | 7.1 | 7.3 | 170 | 5.8 | 6.4 | 100 | 0.46 | 0.85 | 0.87 | 1.82 |
| A2 | 7.2 | 7.3 | 150 | | | | | | | |

| Sample | Wash-wear rating Tumble dry 1L | 5L | 10L | Line dry 5L | Crease recovery, degrees Dry | Wet | In warp direction Strength, lb. Tensile | Tear | Flex Abrader, cycles | Damage, percent caused by retained chlorine | Loss of added weight, percent in acid hydrolysis |
|---|---|---|---|---|---|---|---|---|---|---|---|
| A1 | 4.8 | 4.3 | 4.5 | 2.0 | 261 | 254 | 35 | 0.9 | 250 | 5 | 62 |
| A2 | 5.0 | 4.5 | 4.8 | 2.0 | 282 | 258 | 29 | 0.8 | 150 | None | |

Second step

The same as in the second step of Example 20. The resulting sample is coded D3X. See Example 37 for the procedure leading to Samples C1 and C1X.

EXAMPLE 38

Reagent:

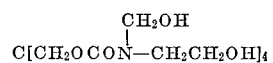

| Sample | Reagent, percent on weight of fabric | Catalyst | Curing temperature, °C. | Moisture regain, percent | Weight gain, percent corrected for moisture regain | N, percent Found | N, percent Calculated from weight gain | HCHO, percent Found | HCHO, percent Calculated from weight gain |
|---|---|---|---|---|---|---|---|---|---|
| D3 | 7.5 | 3% citric | 135, 30″ | 6.2 | 6.3 | 0.44 | 0.83 | 0.78 | 1.78 |
| C1 | 7.8 | 6% NaCl | 150, 5′ | 6.9 | 0.8 | None | 0.11 | 0.11 | 0.24 |

| Sample | Wash-wear rating Tumble dry 1L | 5L | 10L | Line dry 5L | Crease recovery, degrees Dry | Crease recovery, degrees Wet | In warp direction Strength, lb. Tensile | In warp direction Strength, lb. Tear | Flex Abrader, cycles | Damage, percent caused by retained chlorine | Loss of added weight, percent in acid hydrolysis |
|---|---|---|---|---|---|---|---|---|---|---|---|
| D3 | | | | | 225 | 235 | | | | 2 | |
| D3X | 4.3 | 3.5 | 3.5 | 2.5 | 276 | 270 | | | | 18 | 31 |
| C1 | | | | | 195 | 169 | | | | 5 | |
| C1X | 2.8 | 2.5 | 2.0 | 1.5 | 229 | 215 | 22 | 0.7 | 150 | 14 | |

EXAMPLE 37

Reagent: Same as for Example 34.
First step: NaCl (6%) also in pad bath; 5-minute cure at 150° C.; coded "C1."
Second step: Same as in Example 36 (MgCl₂; after-cured 5 minutes at 170° suffix "X" after "C1."

The process of Example 36 is repeated with 2 exceptions in the first step, viz, (a) the 3%, by weight, citric acid in the pad bath is replaced with 6%, by weight, of sodium chloride, and (b) the fabric samples are cured at 150° C. for 5 minutes (in lieu of the "short cure"). Treatment data and performance properties of the samples (C1 and C1X) are shown in the 2-section table above in Example 36.

Procedure: Single application from neutral pad bath (as in Example 18); coded "A" and "C" depending on amount of reagent on fabric.
Cure: MgCl₂-catalyzed; 150 and 170° C. compared (5 minutes); coded respectively "2" and "1."

The process of Example 18 is followed except that the polymethylolated pentaerythritol tetrakis[N-(2-hydroxyethyl)-carbamate] product of Example 11 is used as the reagent. Treatment data and performance properties are shown in the following 2-section table.

| Sample | Reagent, percent on weight of fabric | pH of pad bath | Curing temperature, °C. | Moisture regain, percent | Weight gain, percent corrected for moisture regain | Yield, percent | N, percent Found | N, percent Calculated from weight gain | HCHO, percent Found | HCHO, percent Calculated from weight gain |
|---|---|---|---|---|---|---|---|---|---|---|
| A1 | 6.8 | 6.5 | 170 | 5.8 | 4.2 | 70 | 0.38 | 0.42 | 0.34 | 0.91 |
| A2 | 6.8 | 6.5 | 150 | | | | | | | |
| C1 | 4.5 | 6.5 | 170 | 5.9 | 2.8 | 70 | | | | |
| C2 | 4.4 | 6.5 | 150 | | | | | | | |

| Sample | Wash-wear rating Tumble dry 1L | 5L | 10L | Line dry 5L | Crease recovery, degrees Dry | Crease recovery, degrees Wet | In warp direction Strength, lb. Tensile | In warp direction Strength, lb. Tear | Flex Abrader, cycles | Damage, percent caused by retained chlorine | Loss of added weight, percent in acid hydrolysis |
|---|---|---|---|---|---|---|---|---|---|---|---|
| A1 | 3.0 | 2.5 | 2.5 | 1.0 | 234 | 230 | 39 | 1.0 | 425 | 26 | 50 |
| A2 | 2.0 | 1.5 | 2.5 | 1.0 | 228 | 221 | 43 | 1.1 | 425 | 41 | |
| C1 | 3.0 | 2.5 | 2.5 | 1.0 | 233 | 211 | 36 | 1.0 | 375 | 8 | |
| C2 | 2.0 | 1.0 | 1.5 | 1.5 | 224 | 213 | 42 | 1.1 | 350 | 13 | |

| Sample | Reagent, percent on weight of fabric | pH of pad bath | Curing temperature, °C. | Moisture regain, percent | Weight gain, percent corrected for moisture regain | Yield, percent | N, percent Found | N, percent Calculated from weight gain | HCHO, percent Found | HCHO, percent Calculated from weight gain |
|---|---|---|---|---|---|---|---|---|---|---|
| B1 | 6.8 | 3.5 | 170 | 5.5 | 4.5 | 74 | 0.37 | 0.45 | 0.93 | 0.97 |
| B2 | 6.5 | 3.5 | 150 | | | | | | | |
| D1 | 4.6 | 3.5 | 170 | 5.9 | 2.6 | 66 | | | | |
| D2 | 4.6 | 3.5 | 150 | | | | | | | |

| Sample | Wash-wear rating Tumble dry 1L | 5L | 10L | Line dry 5L | Crease recovery, degrees Dry | Crease recovery, degrees Wet | In warp direction Strength, lb. Tensile | In warp direction Strength, lb. Tear | Flex Abrader, cycles | Damage, percent caused by retained chlorine | Loss of added weight, percent in acid hydrolysis |
|---|---|---|---|---|---|---|---|---|---|---|---|
| B1 | 4.0 | 3.8 | 3.5 | 1.0 | 248 | 256 | 24 | 0.5 | 150 | 25 | 42 |
| B2 | 4.0 | 3.5 | 3.5 | 1.0 | 252 | 252 | 23 | 0.6 | 200 | 12 | |
| D1 | 3.5 | 3.0 | 2.5 | 1.0 | 249 | 248 | 15 | 0.4 | 55 | 8 | |
| D2 | 3.8 | 3.5 | 3.0 | 1.0 | 258 | 249 | 19 | 0.5 | 75 | 14 | |

EXAMPLE 40

Reagent: Same as for Example 38.
First step: Citric acid (3%) also in pad bath; short cure 30 sec., 135° C.; coded "F3."

Second step: Re-pad with MgCl$_2$; after-cure (5 minutes at 170° C.) suffix "X" after "F3."

First step

The process of Example 20 is followed except that the polymethylolated pentaerythritol tetrakis[N-(2-hydroxyethyl)-carbamate] product of Example 11 is used as reagent. The resulting fabric sample is coded F3.

Second step

As in the second step of Example 20 the resulting sample is coded F3X. (See Example 41 for the procedure leading to samples E1 and E1X.)

Crease retention ratings for all samples so processed are very good (3.5 to 4.5) even after 10 launderings and tumble drying.

EXAMPLE 44

Reagents: Same as listed for Example 42.
Procedure: Based on conditions in Example 20, i.e., citric acid (3%) in pad bath and short cure (30 seconds at 135° C.) in First Step. Then storage, re-padding with MgCl$_2$, and deferred after-cure (5 minutes at 170° C.).

First step

Using each of the reagents of Example 42 individually

| Sample | Reagent, percent on weight of fabric | Catalyst | Curing temperature °C. | Moisture, regain, percent | Weight gain, percent corrected for moisture regain | N, percent Found | N, percent Calculated from weight gain | HCHO, percent Found | HCHO, percent Calculated from weight gain |
|---|---|---|---|---|---|---|---|---|---|
| F3 | 7.3 | 3% citric | 135, 30″ | 6.1 | 4.4 | 0.42 | 0.44 | 0.82 | 0.95 |
| E1 | 7.3 | 6% NaCl | 150, 5′ | 7.1 | 0.4 | None | 0.05 | 0.1 | 0.11 |

| Sample | Wash-wear rating Tumble dry 1L | Wash-wear rating Tumble dry 5L | Wash-wear rating Tumble dry 10L | Wash-wear rating Line dry 5L | Crease recovery, degrees Dry | Crease recovery, degrees Wet | In warp direction Strength, lb. Tensile | In warp direction Strength, lb. Tear | Flex Abrader, cycles | Damage, percent caused by retained chlorine | Loss of added weight, percent in acid hydrolysis |
|---|---|---|---|---|---|---|---|---|---|---|---|
| F3 | | | | | 238 | 208 | | | | 6 | |
| F3X | 2.0 | 2.0 | 2.0 | 1.0 | 229 | 242 | 26 | 0.8 | 200 | 4 | 42 |
| E1 | | | | | 187 | 171 | | | | 4 | |
| E1X | 1.5 | 1.0 | 1.0 | 1.0 | 208 | 209 | 22 | 0.8 | 175 | None | |

EXAMPLE 41

Reagent: Same as for Example 38.
First step: NaCl (6%) also in pad bath; 5-minute cure at 150° C.; coded "E1."
Second step: Same as in Example 45 (MgCl$_2$; after-cured 5 minutes at 170° C.); suffix "X" after "E1."

The process of Example 40 is repeated with 2 exceptions in the first step, viz., (a) the 3%, by weight, citric acid in the pad bath is replaced by 6%, by weight, sodium chloride, a neutral salt, and (b) the fabric samples are cured at 150° C. for 5 minutes (in lieu of the "short cure"). Treatment data and performance properties of the samples (E1 and E1X) are shown in the 2-section table above in Example 40.

EXAMPLE 42

Reagents: Those (individually) of Examples 18, 22, 26, 30 and 34 respectively.
Procedure: Based on conditions in Example 18, i.e., neutral pad bath, but *deferred cure* (170° C. for 5 minutes) catalyzed by MgCl$_2$.

Using each of the above-identified reagents individually in turn, the process of Example 18 is followed with two exceptions. After the treated samples are dried at 60° C., they are (1) stored at room temperature for 3 months. At the end of that storage period, they are (2) creased in the warp direction in a Hoffmann press, initially with steam for 0.5 minute at 140–150° C., followed by curing at 170° C. for 5 minutes.

Crease retention ratings for all samples so processed are excellent (4.5 to 5.0) and likewise all wash-and-wear ratings are excellent (4.5 to 5.0) after 10 launderings and tumble dryings.

EXAMPLE 43

Reagents: Same as listed for Example 42.
Procedure: Based on conditions in Example 19, i.e., acidified pad bath, but *deferred cure* (170° C. for 5 minutes) catalyzed by MgCl$_2$.

Using each of the reagents of Example 42 individually in turn, the procedural details of Example 19 are followed with the same two exceptions described in Example 42.

in turn, the process of Example 20 is followed except that after the short-cured samples are neutralized and rinsed, they are stored for 3 months.

Second step

At the end of the storage period, the samples are padded with magnesium chloride as in the Second Step of Example 20 and creased with the equipment and conditions stated in Example 42.

Crease retention ratings for all samples so processed are good (3.0 to 4.0), and furthermore, all wash-and-wear ratings are good (3.0 to 4.0) even after 10 launderings and tumble drying.

EXAMPLE 45

Reagents: Individually those of Examples 18, 22 and 26, respectively.
Procedure: Based on conditions in Example 21, i.e., NaCl (6%) in pad bath and 5-minute cure at 150° C. in First Step. Then *storage*, re-padding with MgCl$_2$ and *deferred after-cure* (5 minutes at 170° C.).

First step

Using each of the reagents of Examples 18, 21 and 26 individually, the process of Example 21 is followed except that after the fabric samples are initially cured at 150° C. for 5 minutes, and neutralized and rinsed, they are stored for 3 months.

Second step

At the end of that storage period, they are padded with magnesium chloride as in the Second Step of Examples 20 and 21 and are creased with the equipment and conditions stated in Example 42.

Crease retention ratings for all samples so processed are good (3.5 to 4.0), and furthermore, all wash-and-wear ratings are good (3.5 to 4.0) even after 10 launderings and tumble drying.

EXAMPLE 46

Comparison of a representative compound of this invention with a related compound of the prior art (A) *General*.—To demonstrate the substantial superiority in crosslinking effectiveness of the polymethylolated polycarbamtes of the present invention over related compounds of the prior art, the following carefully controlled experiments are performed. The composition of this invention that is used in this example is pentaerythritol tetrakis - [(N,N-bis(hydroxymethyl)carbamate], referred to as the novel type. The composition of the prior art employed is ethyl N,N-bis(hydroxymethyl)carbamate, referred to as the prior art type. The latter compound is a dimethylol carbamate known to be an effective crosslinking agent for cellulosics.

The efficacy of the two compositions as crosslinking agents is determined by standard hydrolysis tests performed on two sets of plain-weave cotton fabric; one set cured with the composition of the novel type, the other with the composition of the prior art type.

(B) Treatment procedure.—Samples of plain-weave cotton fabric (80 x 80 print cloth) are conditioned at 65% RH and weighed. Half of them (Samples A, C, and E) are impregnated from a pad bath containing the novel-type polymethylol compound of pentaerythritol tetracarbamate and a concentrated magnesium chloride solution (Accelerator MX) is utilized as a catalyst. Both samples are treated with identical catalyst and reagent concentrations as shown in the following table. The remaining samples (G, I, and K) are impregnated with a solution taken from a pad bath containing ethyl N,N-bis(hydroxymethyl)carbamate (the piror art type) and Accelerator MX. Three concentration levels are employed, the resulting impregnation percentages based on the weight of the fabric being approximately 6.5% for Samples A and G, 4.5% for Samples C and I, and 2.7% for Samples E and K. These percentages are determined after the fabric samples are padded, dried, cured at 150° C. for 5 minutes, rinsed, washed, re-rinsed, re-dried, and conditioned as had been done in Example 18. In the following table, treatment data are in the first section and evaluation results are in the second section.

Acid hydrolysis.—Both sets, each consisting of 3 treated fabric samples, are then subjected to hydrolysis at 80° C. for 30 minutes, the fabric-to-liquor ratio being 1:30 by weight, and the catalyst being 1.0% phosphoric acid and 5% urea.

Next, the samples are rinsed, dried, and conditioned as previously. Pertinent properties after acid hydrolysis are as follows:

PROPERTIES AFTER ACID HYDROLYSIS

| Sample: | Reagent type | N, percent found | Crease recovery, degrees (warp plus filling) | |
|---|---|---|---|---|
| | | | Dry | Wet |
| A | Novel | 0.50 | 266 | 274 |
| C | do | 0.45 | 227 | 256 |
| E | do | 0.30 | 228 | 232 |
| G | Prior art | 0.19 | 238 | 247 |
| I | do | 0.08 | 218 | 235 |
| K | do | 0.03 | 211 | 223 |

It can be seen from the above data that Samples G, I, and K (all treated with ethyl N,N-bis(hydroxymethyl) carbamate of the prior art), have considerably less nitrogen, i.e., less remaining crosslinks, after hydrolysis than did their counterparts treated with the novel polymethylolated pentaerythritol tetracarbamate of this invention. Likewise, Samples G, I, and K have crease recovery values which are lower than the values for the corresponding samples (A, C, and E, respectively). Accordingly, the polymethylol polycarbamate imparted outstanding resistance to hydrolytic degradation compared to the representative prior art composition, ethyl N,N-dimethylolcarbamate. This resistance to laundering prior to this invention has not been obtainable.

In order to single out the clear and substantial distinction between the prior art and the novel N-methylolcarbamates (of this invention) as to durability and efficacy in treating cellulosic textile material, the results before

TREATMENT DATA

| | Pad bath | | Wet pickup, percent | Reagent, percent, on weight of fabric | Moisture regain, percent | Weight gain, percent, corrected for moisture regain | Yield, percent | N, percent | | HCHO, percent | |
|---|---|---|---|---|---|---|---|---|---|---|---|
| | Reagent, percent | MX, percent | | | | | | Found | Calculated from weight gain [1] | Found | Calculated from weight gain [1] |
| Sample: | | | | | | | | | | | |
| A | [2] 7.0 | 4.9 | 93 | [2] 6.51 | 5.61 | 4.85 | 100 | 0.58 | 0.64 | 1.77 | 2.75 |
| C | [2] 5.0 | 3.5 | 91 | [2] 4.55 | 5.63 | 3.64 | 100 | 0.46 | 0.49 | 1.49 | 2.08 |
| E | [2] 3.0 | 2.1 | 92 | [2] 2.76 | 5.73 | 2.11 | 100 | 0.30 | 0.29 | 0.98 | 1.22 |
| G | [3] 7.0 | 4.9 | 92 | [3] 6.44 | 5.08 | 4.03 | 83 | 0.55 | 0.48 | 1.85 | 2.05 |
| I | [3] 5.0 | 3.5 | 90 | [3] 4.50 | 5.32 | 3.31 | 97 | 0.37 | 0.40 | 1.42 | 1.70 |
| K | [3] 3.0 | 2.1 | 91 | [3] 2.73 | 5.82 | 1.73 | 83 | 0.25 | 0.21 | 0.88 | 0.90 |
| Untreated control | | | | | 5.83 | | | | | | |

[1] In calculating percentages from weight gain, the assumption is made that the maximum molar quantity of water is lost.
[2] Novel type.
[3] Prior art type.

EVALUATION RESULTS (BEFORE HYDROLYSIS)

| | Wash-wear | | Crease Recovery, Degrees (Total) | | In warp direction | | | |
|---|---|---|---|---|---|---|---|---|
| | Tumble dry 1L | Line dry 1L | Dry | Wet | Strength, pounds | | Flex Abration, cycles | Damage, percent caused by retained chlorine |
| | | | | | Tensile | Tear | | |
| Sample: | | | | | | | | |
| A | 4.8 | 3.5 | 277 | 279 | 34 | 0.9 | 115 | 3 |
| C | 4.5 | 2.5 | 249 | 262 | 38 | 1.0 | 150 | 11 |
| E | 4.0 | 1.5 | 255 | 268 | 40 | 1.1 | 250 | 19 |
| G | 5.0 | 2.5 | 273 | 276 | 34 | 0.9 | 120 | 6 |
| I | 4.5 | 2.0 | 258 | 270 | 36 | 0.9 | 175 | 11 |
| K | 3.0 | 1.5 | 246 | 253 | 40 | 1.1 | 200 | 10 |
| Untreated control | 1.0 | 1.0 | 188 | 183 | 60 | 1.8 | 400 | 7 | and after accelerated hydrolytic treatment are set side by side in the following summarizing re-tabulation.

reaction solutions using conventional application methods and equipment. Further, curing takes place under mild

| | Reagent | | N found, percent | | | Crease recovery, degrees (warp—filling) | | | |
|---|---|---|---|---|---|---|---|---|---|
| | | | | | | Dry | | Wet | |
| | Percent on weight of fabric | Type | Before hydrolysis | After hydrolysis | Comment | Before hydrolysis | After hydrolysis | Before hydrolysis | After hydrolysis |
| Samples: | | | | | | | | | |
| A | 6.48±0.04 | Novel | 0.58 | 0.50 | Minor loss | 277 | 266 | 279 | 274 |
| G | 6.48±0.04 | Prior | 0.55 | 0.19 | Large decrease | 273 | 238 | 276 | 247 |
| C | 4.53±0.03 | Novel | 0.46 | 0.45 | Negligible loss | 249 | 227 | 262 | 256 |
| I | 4.53±0.03 | Prior | 0.37 | 0.08 | Pronounced decrease | 258 | 218 | 270 | 235 |
| E | 2.74±0.02 | Novel | 0.30 | 0.30 | Constant | 255 | 228 | 268 | 232 |
| K | 2.74±0.02 | Prior | 0.25 | 0.03 | Excessive decrease | 246 | 211 | 253 | 233 |
| Untreated control | None | Blank | | | | 188 | | 183 | |

This invention is advantageous both in its compositional and process aspects. For example, some of the nitrogen-substituted derivatives of the tris and higher polycarbamates can be valuable organic intermediates in the textile and pesticide fields. The polymethylolated polycarbamates are very effective as modifying agents for polymeric materials. These reagents are particularly effective as crosslinking agents for the cellulosics and other polymers containing a plurality of hydroxyl groups. When the polymethylolated derivatives are employed as crosslinking agents, they do not require isolation or purification. That is, the reagent can be used in the form of the reaction mixture. This offers an important savings in labor and processing costs.

After exposure to chemical agents, the wrinkle resistance and crease recovery of cellulosic fabrics modified with the reagents of this invention are far superior to that obtained using the known polymethylolated compounds of the prior art. Considering that the activity of both the inventive compositions and those of the art are derived from the same carbamate functional groups, the results obtained are most surprising.

Particularly unexpected is the discovery that finishes based on polymethylolated polycarbamates of this invention exhibit outstanding improvement in resistance to hydrolysis compared to those of commercially accepted bis(hydroxymethyl)carbamates of the prior art. For instance, as demonstrated in Example 43, when a representative reactive carbamate of this invention and a prior-art compound, ethyl N,N-bis(hydroxymethyl)carbamate, were evaluated as wash-and-wear finishes on a cellulosic fabric, hydrolytic degradation was dramatically diminished using the inventive composition as compared to the reagent of the prior art.

A further unsuspected finding of considerable economic importance in the wash-and-wear industry is that the use of the novel polymethylolated polycarbamates of this invention causes only minimal damage due to bleaching. This certainly could not have been predicted in view of the generally accepted belief in the art that finishes which contain a plurality of reactive carbamate nitrogens are prone to cause chlorine damage. This determination, which is contrary to the teaching of the prior art, would lead one away from this invention rather than to it and is therefore both unusual and unobvious.

In its process aspects, the modification methods disclosed in this invention are partcularly advantageous. For instance, the reagents can be applied in the form of their reaction solutions using conventional application methods and equipment. Further, curing takes place under mild conditions and can be immediate or deferred, using either acidic or neutral salt reagents.

The development of novel crosslinking reagents which possess the combination of both good long-term storage life and rapid curability at mild temperatures is unique in the art. The two characteristics are, to say the least, antithetical. Ordinarily the multifunctionality of the reagents, combined with their ease of curing, would presage poor stability whereas good storage stability of the treated fabrics would lead on to expect the need for severe curing. Thus, the finding of a novel class of modifying agents with combination of characteristics heretofore unobtainable is most surprising.

As indicated above and in the various examples, an additional process advantage of this invention is the flexibility of the catalyst systems that can be used. For instance, the activator or catalyst employed can be acidic or neutral in nature, and as described earlier, the modified textile fabrics have greatly enhanced wash-and-wear properties.

As the numerous embodiments clearly indicate, various modifications, substitutions and changes can be made in reactants, reaction conditions, textile substrates, curing conditions and the like without departing from the inventive process. The metes and bounds of this invention are best described by the claims which follow.

What is claimed is:
1. A compound of the formula:

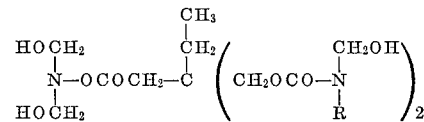

wherein R is hydrogen or —CH$_2$OH.

2. A compound as claimed in claim 1 wherein R at each occurrence is —CH$_2$OH.

References Cited
FOREIGN PATENTS
952,090  11/1949  France _____ 260—482B LORRAINE A. WEINBERGER, Primary Examiner P. J. KILLOS, Assistant Examiner U.S. Cl. X.R.

260—612, 77.5, 621; 8—116.2, 129; 252—8.8

PO-1050
(5/69)

UNITED STATES PATENT OFFICE
CERTIFICATE OF CORRECTION

Patent No. 3,553,254  Dated January 5, 1971

Inventor(s) Giuliana C. Tesoro and Donald R. Moore

It is certified that error appears in the above-identified patent and that said Letters Patent are hereby corrected as shown below:

Column 3, line 22, "hydroxyethyl" should read -- hydroxyalkyl; line 53, in the formula "$R(COH)_p$" should re -- $R(OH)_p$ -- ; Column 4, line 63, "rear" should read -- near Column 11, line 72, "-N-hydroxy" should read -- -N-(hydro: Column 12, line 5, " (hydroxymethylcarbamate]  should read -- (hydroxymethyl)carbamate] -- ; Example 14, line 62, "$CH_2$-OCON($CH_4$)H " should read -- $CH_2$-OCON($CH_3$)H -- ; Column 15, First section of table at bottom of page, under heading "N, percent", column "Found", Sample C1, "0.64" shou: read -- 0.54 --; under heading "N, percent, Calculated from weight gain", Sample A1, "0.78" should read -- 0.87 --; Column 16, Example 19, second section of Table, under Wash-wear rating, 10L, Sample B1, "4.2" should read -- 4.3 Column 17, first section Table, under "HCHO, percent, Calculated from weight gain" Sample E1, "10.9" should read -- 1.09 --; Column 21, Example 27, second section Table, (at bottom of page) under "Crease Recovery, degrees, Dry" Sample D1, "206" should read -- 306 --; Column 31, line 27 "piror" should read -- prior -- ; Column 34, line 26, "lead on" should read -- lead one -- ;

Signed and sealed this 19th day of September 1972.

(SEAL)
Attest:

EDWARD M. FLETCHER, JR.
Attesting Officer

ROBERT GOTTSCHALK
Commissioner of Pate